(12) United States Patent
Takagi et al.

(10) Patent No.: US 8,955,283 B2
(45) Date of Patent: Feb. 17, 2015

(54) MOUNTING BASE

(75) Inventors: Kazumasa Takagi, Tokyo (JP); Eizou Takagi, Tokyo (JP)

(73) Assignee: Marutaka-Kogyo Inc., Tokyo (JP)

( * ) Notice: Subject to any disclaimer, the term of this patent is extended or adjusted under 35 U.S.C. 154(b) by 0 days.

(21) Appl. No.: 13/993,846

(22) PCT Filed: Dec. 15, 2011

(86) PCT No.: PCT/JP2011/079025
§ 371 (c)(1),
(2), (4) Date: Aug. 21, 2013

(87) PCT Pub. No.: WO2012/081660
PCT Pub. Date: Jun. 21, 2012

(65) Prior Publication Data
US 2013/0326992 A1    Dec. 12, 2013

(30) Foreign Application Priority Data

Dec. 15, 2010  (JP) .................................. 2010-279461
Dec. 14, 2011  (JP) .................................. 2011-273811

(51) Int. Cl.
| E04H 12/00 | (2006.01) |
| E04C 5/00 | (2006.01) |
| E04D 13/14 | (2006.01) |
| F16M 9/00 | (2006.01) |
| F24J 2/52 | (2006.01) |
| E04B 1/16 | (2006.01) |
| E04B 1/41 | (2006.01) |
| F24F 13/32 | (2006.01) |

(52) U.S. Cl.
CPC .............. *E04C 5/00* (2013.01); *E04D 13/1407* (2013.01); *F16M 9/00* (2013.01); *F24J 2/5245* (2013.01); *F24J 2/525* (2013.01); *E04B 1/165* (2013.01); *E04B 1/41* (2013.01); *F24F 13/32* (2013.01); *Y02E 10/47* (2013.01)
USPC ............................ 52/649.2; 52/699; 52/293.3

(58) Field of Classification Search
USPC ............. 52/649.2, 699, 424, 425, 295, 125.5, 52/27, 319, 293.3, 296, 297
See application file for complete search history.

(56) References Cited

U.S. PATENT DOCUMENTS 2,205,545 A * 6/1940 Schmitt ............................. 52/27
2,625,815 A * 1/1953 Black ........................... 52/126.1

(Continued)

FOREIGN PATENT DOCUMENTS

JP      9-70188     3/1997
JP      10-205095   8/1998

(Continued)

*Primary Examiner* — James Ference
(74) *Attorney, Agent, or Firm* — Clark & Brody

(57) ABSTRACT

A mounting base is formed from a metal foundation, height adjustment bolts for adjusting the height dimension of the foundation, support bolts inserted into support bolt insertion holes, a metal cover installed on the foundation, and mortar filling the space between the foundation and the upper surface of a concrete slab. In the base, the first fixed ends of the bolts are inserted into insertion holes formed in a metal plate and are fixed to the metal plate with nuts, and the second fixed ends of the bolts are fixed to a steel beam with nuts. The portion of the first fixed ends of the bolts which extends between the metal plate and the top surface of the concrete floor is integrated with the mortar filling the space, and the metal cover covers the opening at the top of a metal tube of the foundation.

12 Claims, 22 Drawing Sheets

(56) References Cited

U.S. PATENT DOCUMENTS

| | | | | |
|---|---|---|---|---|
| 2,952,947 | A * | 9/1960 | White | 52/708 |
| 3,401,733 | A * | 9/1968 | Circle | 411/107 |
| 3,767,148 | A * | 10/1973 | Crowdy | 248/680 |
| 4,029,275 | A * | 6/1977 | Erismann | 248/680 |
| 4,275,538 | A * | 6/1981 | Bounds | 52/299 |
| 5,016,338 | A * | 5/1991 | Rowan, Jr. | 29/423 |
| 5,282,602 | A * | 2/1994 | Zimmermann | 248/680 |
| 5,379,563 | A * | 1/1995 | Tinsley | 52/295 |
| 5,505,033 | A * | 4/1996 | Matsuo et al. | 52/296 |
| 5,611,974 | A * | 3/1997 | Welch et al. | 264/34 |
| 6,405,992 | B1 * | 6/2002 | Palmer | 248/679 |
| 6,840,022 | B1 * | 1/2005 | Manogue et al. | 52/745.2 |
| 6,893,199 | B2 * | 5/2005 | Michels | 411/340 |
| 7,441,743 | B2 * | 10/2008 | Behlinger et al. | 248/679 |
| 8,091,311 | B2 * | 1/2012 | Akagi et al. | 52/425 |
| 2002/0189173 | A1 * | 12/2002 | Staschik | 52/79.1 |
| 2003/0009964 | A1 * | 1/2003 | Trarup et al. | 52/295 |
| 2004/0040224 | A1 * | 3/2004 | Dayton | 52/93.1 |
| 2006/0080897 | A1 * | 4/2006 | O'Neal | 52/1 |
| 2006/0080936 | A1 * | 4/2006 | Dooley et al. | 52/745.21 |
| 2006/0260232 | A1 * | 11/2006 | Crawford et al. | 52/295 |
| 2007/0044392 | A1 * | 3/2007 | LeBlang | 52/79.11 |
| 2008/0022606 | A1 * | 1/2008 | Akagi et al. | 52/79.11 |

FOREIGN PATENT DOCUMENTS

| | | |
|---|---|---|
| JP | 2003-138699 | 5/2003 |
| JP | 2009-167754 | 7/2009 |
| JP | 3164441 | 11/2010 |

* cited by examiner

MOUNTING BASE

TECHNICAL FIELD

The present invention relates to a mounting base, and more particularly, a mounting base used in installing mechanical appliances such as a solar panel, an antenna, a water tank, a septic tank, and a mechanical appliance such as an air-conditioning apparatus and a structure such as a steel tower and a steel building to a steel structure having a steel skeleton formed from a steel column and a steel beam and a concrete floor provided on the steel skeleton.

BACKGROUND ART

In a concrete structure made of a new or existing reinforced concrete or reinforced/steel-frame reinforced concrete, a solar panel, an antenna, a water tank, a septic tank, a mechanical appliance such as an air-conditioning apparatus, various structures such as a steel tower and a steel building are installed on a rooftop or underground slab. Normally, such a mechanical appliance or a structure are not directly installed on the surface of a slab, but installed on a mounting base installed on a slab in order to prevent water leakage inside the mechanical appliance or the structure and enable the maintenance thereof on the back side.

Illustrative example of the mounting base includes a solar battery panel mounting structure disclosed in Japanese Unexamined Patent Publication No. 9-070188. According to a conventional technology disclosed in the Japanese Unexamined Patent Publication No. 9-070188, a solar battery panel is installed at a construction site where a formwork is produced, a base is prepared by placing and curing concrete in the formwork, and a carried solar battery panel and a carried frame thereof are installed on the base. A mounting base of such a conventional technology unfortunately fails to produce a mounting structure in a short period of time due to on-site production of a formwork, resulting in costs and work and a long time of concrete curing in the formwork.

To solve the conventional technical problem, a solar battery panel mounting structure disclosed Japanese Unexamined Patent Publication No. 9-070188 is characterized in that a base made of concrete or reinforced concrete is produced at a base part manufacturing plant beforehand and its base is carried to a rooftop or underground construction site of a concrete structure. Afterward, a thin cement layer is formed at a mounting position in a rooftop or underground slab, and the base is placed on the cement layer serving as an adhesion layer to be integrated with the concrete slab, and a frame for installing a solar battery panel is installed on the base. A solar battery panel mounting structure disclosed in Japanese Unexamined Patent Publication No. 9-070188 is capable of saving work for producing a formwork at a construction site when forming a base for installing a solar battery panel, simplifying construction work at the construction site, and capable of shortening construction time by saving time for curing concrete.

PRIOR ART DOCUMENT

Patent Document

Patent Document 1: Japanese Unexamined Patent Publication No. 9-070188

SUMMARY OF THE INVENTION

Problem to be Solved by the Invention

In the solar battery panel mounting structure disclosed in said Japanese Unexamined Patent Publication No. 9-070188, a base must be produced by curing concrete at a base part manufacturing plant while concrete is not required to be cured at a construction site. This means that concrete curing is necessary to produce a base regardless of a site and it requires a long time. In addition, since a base produced has to be carried from the plant to the construction site, work for carrying a significant weight of a base is required, resulting in an inability to decrease work and costs for producing a base. Also, when a base produced at the factory is fixed on a slab, only such methods as fixing a concrete layer serving as an adhesion layer to the concrete slab and fitting a lower end of a base into a recessed portion by forming the recessed portion on a slab can be employed, so that the base fails to be firmly installed on the concrete slab.

The aim of the present invention is to provide a mounting base capable of decreasing the work and cost required for installation and capable of shortening construction time. Another aim of the present invention is to provide a mounting base capable of firmly installing a base on a steel structure and capable of firmly installing a machine and equipment and a structure thereon.

Means for Solving the Problem

To solve said problem, the premise of first and second inventions is to provide a mounting base installed at a predetermined position of a steel structure having a steel skeleton formed from a steel column and a steel beam and a concrete floor provided on the steel skeleton.

The characteristic of the first invention under said premise provides a mounting base comprising: a plurality of support bolts that are inserted into bolt holes opening the steel beam and the concrete floor having first fixed ends that upwardly extend by passing through the concrete floor and second fixed ends that downwardly extend by passing through the steel beam; a foundation that is upwardly spaced away from the concrete floor at a predetermined interval; a cover that is installed on the foundation; a frame material that is provided between an outer circumferential edge of the foundation and the concrete floor that blocks a gap between the concrete floor and the outer circumferential edge of the foundation; and a cement cured object that is filled into a space surrounded by the concrete floor, the foundation and the frame material, wherein the foundation has a bottom plate facing the concrete floor and a hollow tubing material that upwardly extends from the bottom plate, wherein first fixed ends of the support bolts are inserted into bolt holes opening the bottom plate and fixed to the bottom plate with a specific fixing means, and second fixed ends of the support bolts are fixed to the steel beam with a specific fixing means, and a portion of the first fixed ends of the support bolts that extends between the concrete floor and the bottom plate is integrated with the cement cured object filled into the space, and the cover blocks an opening at the top of the tubing material. In the mounting base, the opening at the top of the tubing material is blocked by the cover just after filling the cement cured object into the space and prior to completion of a curing period of the cement cured object, the curing period of the cement cured object starts after the opening at the top of the tubing material is blocked by the cover, and a portion of the first fixed ends of the support bolts that extends between the concrete floor and the bottom plate is integrated with the cement cured object after completion of the curing period.

As an illustrative example of said first invention, the bottom plate has a first portion that internally extends in a radial direction of the tubing material and a second portion that externally extends in a radial direction of the tubing material, wherein the first fixed ends of the support bolts are inserted into bolt holes opening the second portion of the bottom plate and fixed to the second portion of the bottom plate and the second fixed ends of support bolts are inserted into bolt holes opening the steel beam facing the second portion and fixed to the steel beam, and the frame material is provided between the outer circumferential edge of the second portion of the bottom plate and the concrete floor that blocks a gap between the concrete floor and the outer circumferential edge of the second portion, and a portion of the first fixed ends of the support bolts that extends between the concrete floor and the second portion of the bottom plate is integrated with the cement cured object filled into the space.

As another illustrative example of said first invention, the concrete floor is formed from a concrete slab provided on the steel column and the steel beam, a waterproof layer provided on the concrete slab and a covering concrete provided on the waterproof layer, wherein the support bolts are inserted into bolt holes opening the second portion of the bottom plate and inserted into bolt holes opening the concrete slab obtained by removing the covering concrete and the waterproof layer from the concrete floor, the tubing material and the first portion of the bottom plate are disposed on the concrete slab provided at an intersecting portion of the steel column and the steel beam and the second portion of the bottom plate is disposed on the concrete slab provided on the steel beam, and the bottom plate is upwardly spaced away from the concrete slab at a predetermined interval.

The characteristic of the second invention under said premise provides a mounting base comprising: a plurality of anchor bolts having first fixed ends that upwardly extend from the concrete floor and second fixed ends that are fixed to anchor holes opening the concrete floor; a foundation that is upwardly spaced away from the concrete floor at a predetermined interval; a cover that is installed on the foundation; a frame material that is provided between an outer circumferential edge of the foundation and the concrete floor that blocks a gap between the concrete floor and the outer circumferential edge of the foundation; and a cement cured object that is filled into a space surrounded by the concrete floor, the foundation and the frame material, wherein the foundation has a bottom plate facing a top surface of the concrete floor and a hollow tubing material that is positioned on a top surface of the bottom plate, wherein first fixed ends of the anchor bolts are inserted into bolt holes opening the bottom plate and fixed to the bottom plate with a specific fixing means, and a portion of the first fixed ends of the anchor bolts that extends between the concrete floor and the bottom plate is integrated with the cement cured object filled into the space, and the cover blocks an opening at the top of the tubing material. In the mounting base, the opening at the top of the tubing material is blocked by the cover just after filling the cement cured object into the space and prior to completion of a curing period of the cement cured object, the curing period of the cement cured object starts after the opening at the top of the tubing material is blocked by the cover, and a portion of the first fixed ends of the anchor bolts that extends between the concrete floor and the bottom plate is integrated with the cement cured object after completion of the curing period.

As an illustrative example of said second invention, the bottom plate has a first portion that internally extends in a radial direction of the tubing material and a second portion that externally extends in a radial direction of the tubing material, wherein the first fixed ends of the anchor bolts are inserted into bolt holes opening the second portion of the bottom plate and fixed to the second portion of the bottom plate and the second fixed ends of the anchor bolts are fixed to anchor holes opening the concrete floor facing the second portion, and a portion of the first free ends of the anchor bolts that extends between the concrete floor and the second portion of the bottom plate is integrated with a cement cured object filled into the space.

As another illustrative example of said second invention, the concrete floor is formed from a concrete slab provided on the steel column and the steel beam, a waterproof layer provided on the concrete slab and a covering concrete provided on the waterproof layer, wherein the anchor bolts are inserted into bolt holes opening the second portion of the bottom plate and fixed to anchor holes opening the concrete slab obtained by removing the covering concrete and the waterproof layer from the concrete floor, the tubing material and the first portion of the bottom plate are disposed on the concrete slab provided at an intersecting portion of the steel column and the steel beam, the second portion of the bottom plate is disposed on the concrete slab provided on the steel beam, and the bottom plate is upwardly spaced away from the concrete slab at a predetermined interval.

As another illustrative example of said first and second inventions, the second portion of the bottom plate is linked to first side plates that upwardly stand from a circumferential edge thereof and second side plates that are positioned between the first side plates that upwardly stand from the second portion, and a space surrounded by the second portion of the bottom plate and the first side plates is partitioned on the foundation and the cement cured object is filled into the space.

As another illustrative example of said first and second inventions, the second portion of the bottom plate is linked to first side plates that upwardly stand from a circumferential edge thereof and second side plates that are positioned between the first side plates that upwardly stand from the second portion, and a space surrounded by the second portion of the bottom plate and the first side plates is partitioned on the foundation and a top plate blocks an opening at the top of the space.

As another illustrative example of said first and second inventions, the mounting base includes a waterproof layer covering the foundation, and a portion that externally extends from the second portion of the bottom plate of the waterproof layer is connected to a waterproof layer of the concrete floor.

As another illustrative example of said first and second inventions, a fill hole for filling the cement cured object into the space between the concrete floor and the bottom plate is provided at a predetermined position of the bottom plate.

As another illustrative example of said first and second inventions, a confirmation hole for confirming the state of the cement cured object filled into the space between the concrete floor and the bottom plate is provided at a predetermined position of the bottom plate.

As another illustrative example of said first and second inventions, the mounting base includes height-adjusting bolts screwed into screwing holes opening the bottom plate that adjust the height dimension of the foundation, and the height dimension of the space and the height dimension of the foundation from the concrete floor can be adjusted by adjusting the screwing position relative to the bottom plate of the height-adjusting bolts.

Advantageous Effect of the Invention

The mounting base according to said first invention is formed from a plurality of support bolts, a foundation that is upwardly spaced away from a concrete floor at a predetermined interval, a cover that is installed on the foundation, a frame material that blocks a gap between the concrete floor and an outer circumferential edge of the foundation and a cement cured object that is filled into a space, wherein all of these general-purpose components are assembled in unit construction system at a construction site (mounting position), and it is not necessary to produce a formwork at a construction site when constructing a base and to cure a cement cured object at a base part manufacturing plant and a construction site to produce a base. A base can be constructed only by fixing a plurality of support bolts to a bottom plate of the light foundation and a steel beam, filling a cement cured object into a space and fixing a cover to the foundation, thereby saving work and time for producing a formwork and curing the cement cured object, simplifying construction work and significantly shortening construction time required therefor. In the mounting base, first fixed ends of support bolts are fixed to the bottom plate of the foundation and second fixed ends of support bolts are fixed to the steel beam. After completion of a curing period of the cement cured object, bolt portions are integrated with the cement cured object, and the load on the base is borne by the bolts and the cement cured object, thereby firmly installing the base on a steel structure and firmly installing a solar panel, an antenna, a water tank, a septic tank, and a mechanical appliance such as an air-conditioning apparatus, a structure such as a steel tower and a steel building thereon. In the mounting base, a cement cured object is filled into a space surrounded by the concrete floor, the bottom plate of the foundation and a frame material and the load on the base produced by installing a machine and equipment and a structure thereon is borne by the support bolts and the cement cured object so that the base doesn't incline or collapse in an undesired manner due to uneven load distribution on the base to assuredly support the machine and equipment and the structure. In the mounting base, even if a gap between the concrete floor and an outer circumferential edge of the foundation is filled with the frame material to fill the cement cured object into said space, the cement cured object never leaks out of the gap (space). An opening at the top of a tubing material can be blocked with the cover just after the cement cured object is filled into the space and prior to completion of a curing period of the cement cured object, and another base mounting work can be conducted accordingly. Thus, construction time corresponding to the curing period of the cement cured object can be shortened and construction time of a mounting base can be significantly shortened. In the mounting base, it is not necessary to install a formwork for curing the cement cured object near the outside of the outer circumferential edge of the foundation, thereby saving work, time and cost for installing a formwork.

The mounting base is characterized in that the bottom plate has a first portion and a second portion, and first fixed ends of the support bolts are inserted into bolt holes opening the second portion of the bottom plate and fixed to the second portion and second fixed ends of the support bolts are inserted into bolt holes opening a steel beam facing the second portion and fixed to the steel beam, and a frame material blocks a gap between the concrete floor and an outer circumferential edge of the second portion. A Portion of the first fixed ends of the support bolts that extends between the concrete floor and the second portion of the bottom plate is integrated with a cement cured object filled into a space. In the above characteristic, it is not necessary to produce a formwork at a construction site when constructing a base and to cure a cement cured object at a base part manufacturing plant and a construction site to produce a base. A base can be constructed only by fixing a plurality of support bolts to the second portion of the bottom plate of a light foundation and the steel beam, filling a cement cured object into a space and fixing a cover to a foundation. Thus, work, cost and time required for producing a formwork and curing a cement cured object can be saved and construction work can be simplified, and construction time required therefor can be significantly shortened. In the mounting base, first fixed ends of the support bolts are fixed to the second portion of the bottom plate and second fixed ends of the support bolts are fixed to the steel beam. Bolt portions are integrated with the cement cured object after completion of a curing period of the cement cured object and the load on the base is borne by the bolts and the cement cured object, thereby firmly installing the base on a steel structure and firmly installing a solar panel, an antenna, a water tank, a septic tank, and a mechanical appliance such as an air-conditioning apparatus, a structure such as a steel tower and a steel building thereon. In the mounting base, the area of the bottom plate can be secured by externally extending the bottom plate in a radical direction of a tubing material to form the second portion and the load on the base is borne with the bottom plate, and instead the radial size of the tubing material is made smaller to reduce the weight of the tubing material, thereby making the tubing material lighter and thus making the base lighter.

The mounting base is characterized in that the concrete floor is formed from a concrete slab, a waterproof layer and a covering concrete, and support bolts are inserted into bolt holes opening a second portion of a bottom plate and inserted into bolt holes opening a slab obtained by removing the covering concrete and the waterproof layer from the concrete floor. A tubing material and a first portion of the bottom plate are disposed on the concrete slab provided at an intersecting portion of a steel column and a steel beam and a second portion of the bottom plate is disposed on the concrete slab provided on the steel beam, and the bottom plate is upwardly spaced away from a top surface of the concrete slab at a predetermined interval. In the mounting base, a base can be constructed only by fixing support bolts to the second portion of the bottom plate of a light foundation and the steel beam, filling a cement cured object into a space and fixing a cover to the foundation, thereby saving work, cost and time required for producing a formwork and curing a cement cured object, simplifying construction work and significantly shortening construction time required therefor. In the mounting base, even if a mounting position thereof is on a concrete floor having a waterproof layer provided with a waterproof function on a rooftop and underground part of an existing steel structure, a base is installed on the concrete slab exposed after removing the waterproof layer at the mounting position, a waterproof layer near the mounting position can be repaired (a new waterproof layer is provided) just after installing the base, thereby promptly installing the base and significantly shortening time required for installing the base.

The mounting base according to said second invention is formed from a plurality of anchor bolts, a foundation that is upwardly spaced away from a concrete floor at a predetermined interval, a cover that is installed on the foundation, a frame material that blocks a gap between the concrete floor and an outer circumferential edge of the foundation and a cement cured object that is filled into a space, wherein all of these general-purpose components are assembled in unit construction system at a construction site (mounting position), and it is not necessary to produce a formwork at a construction site when constructing a base and to cure a cement cured object at a base part manufacturing plant and a construction site to produce a base. A base can be constructed only by fixing a plurality of anchor bolts to anchor holes of the concrete floor and a bottom plate of the light foundation, filling a cement cured object into a space and fixing a cover to the foundation, thereby saving work and time for producing a formwork and curing the cement cured object, simplifying construction work and significantly shortening construction time required therefor. In the mounting base, first fixed ends of anchor bolts are fixed to the bottom plate of the foundation and second fixed ends of anchor bolts are fixed to the concrete floor. After completion of a curing period of the cement cured object, bolt portions are integrated with the cement cured object, and the load on the base is borne by the bolts and the cement cured object, thereby firmly installing the base on a steel structure and firmly installing a solar panel, an antenna, a water tank, a septic tank, and a mechanical appliance such as an air-conditioning apparatus, a structure such as a steel tower and a steel building thereon. In the mounting base, a cement cured object is filled into a space surrounded by the concrete floor, the bottom plate of the foundation and a frame material and the load on the base produced by installing a machine and equipment and a structure thereon is borne by the anchor bolts and the cement cured object so that the base doesn't incline or collapse in an undesired manner due to uneven load distribution on the base to assuredly support the machine and equipment and the structure. In the mounting base, even if a gap between the concrete floor and an outer circumferential edge of the foundation is blocked with the frame material to fill the cement cured object into said space, the cement cured object never leaks out of the gap (space). An opening at the top of a tubing material can be blocked with the cover just after the cement cured object is filled into the space and prior to completion of a curing period of the cement cured object, and another base mounting work can be conducted accordingly. Thus, construction time corresponding to the curing period of the cement cured object can be shortened and construction time of a mounting base can be significantly shortened. In the mounting base, it is not necessary to install a formwork for curing the cement cured object near the outside of the outer circumferential edge of the foundation, thereby saving work, time and cost for installing a formwork.

The mounting base is characterized in that the bottom plate has a first portion and a second portion, and first fixed ends of the anchor bolts are inserted into bolt holes opening the second portion of the bottom plate and fixed to the second portion and second fixed ends of the anchor bolts are inserted into anchor holes opening a concrete floor facing the second portion. A portion of the first fixed ends of the anchor bolts that extends between the concrete floor and the second portion of the bottom plate is integrated with a cement cured object filled into a space. In the above characteristic, it is not necessary to produce a formwork at a construction site when constructing a base and to cure a cement cured object at a base part manufacturing plant and a construction site to produce a base. A base can be constructed only by fixing a plurality of anchor bolts to anchor holes of the concrete floor and the second portion of the bottom plate of a light foundation, filling a cement cured object into a space and fixing a cover to a foundation. Thus, work and time required for producing a formwork and curing a cement cured object can be saved and construction work can be simplified, and construction time required therefor can be significantly shortened. In the mounting base, first fixed ends of the anchor bolts are fixed to the second portion of the bottom plate and second fixed ends of the anchor bolts are fixed to the anchor holes of the concrete floor. Bolt portions are integrated with the cement cured object after completion of a curing period of the cement cured object and the load on the base is borne by the bolts and the cement cured object, thereby firmly installing the base on a steel structure and firmly installing a solar panel, an antenna, a water tank, a septic tank, and a mechanical appliance such as an air-conditioning apparatus, a structure such as a steel tower and a steel building thereon. In the mounting base, the area of the bottom plate can be secured by externally extending the bottom plate in a radical direction of a tubing material to form the second portion and the load on the base is borne with the bottom plate, and instead the radial size of the tubing material is made smaller to reduce the weight of the tubing material, thereby making the tubing material lighter and thus making the base lighter.

The mounting base is characterized in that the concrete floor is formed from a concrete slab, a waterproof layer and a covering concrete, and anchor bolts are inserted into bolt holes opening a second portion of a bottom plate and fixed to anchor holes opening a slab obtained by removing the covering concrete and the waterproof layer from the concrete floor. A tubing material and a first portion of the bottom plate are disposed on the concrete slab provided at an intersecting portion of a steel column and a steel beam and a second portion of the bottom plate is disposed on the concrete slab provided on the steel beam, and the bottom plate is upwardly spaced away from the concrete slab at a predetermined interval. In the mounting base, a base can be constructed only by fixing anchor bolts to anchor holes of the concrete slab and the second portion of the bottom plate of a light foundation, filling a cement cured object into a space and fixing a cover to the foundation, thereby saving work, cost and time required for producing a formwork and curing a cement cured object, simplifying construction work and significantly shortening construction time required therefor. In the mounting base, even if a mounting position thereof is on a concrete floor having a waterproof layer provided with a waterproof function on a rooftop and underground part of an existing steel structure, a base is installed on the concrete slab exposed after removing the waterproof layer at the mounting position, a waterproof layer near the mounting position can be repaired (a new waterproof layer is provided) just after installing the base, thereby promptly installing the base and significantly shortening time required for installing the base.

The mounting base is characterized in that a second portion of a bottom plate is linked to first side plates and second side plates, and a space surrounded by the second portion of the bottom plate and the first side plates is partitioned on a foundation to fill a cement cured object into the spade. The first and second side plates serve as a reinforcing plate that increases the strength of the bottom plate, thereby preventing deformation and damage of the bottom plate by such a side plate. Therefore, the mounting base can be firmly installed on a steel structure so that the base doesn't incline or collapse in an undesired manner by the load of the base to assuredly support a machine and equipment and a structure. In the mounting base, since support bolts or anchor bolts are not exposed in the space by filling a cement cured object into the space, corrosion of the bolts or loosening thereof can be prevented, and release of fixation of the bolts and the bottom plate from corrosion of the bolts can be prevented and loss of functions of the base from loosening of fixation of the bolts can be prevented.

The mounting base is characterized in that a second portion of a bottom plate is linked to first side plates and second side plates and a space surrounded by the second portion of the bottom plate and the first side plates is partitioned on a foundation to block an opening of the space with a top plate. The first and second side plates serve as a reinforcing plate that increases the strength of the bottom plate, thereby preventing deformation and damage of the bottom plate by such a side plate. Therefore, the mounting base can be firmly installed on a steel structure so that the base doesn't incline or collapse in an undesired manner by the load of the base to assuredly support a machine and equipment and a structure. In the mounting base, support bolts and anchor bolts are not exposed outside to prevent water leakage inside the space, thereby preventing corrosion of the bolts and release of fixation of the bolts and the bottom plate from corrosion of the bolts. In the mounting base, the opening at the top of the space is blocked only with a top plate, thereby shortening a period for curing a cement cured object compared to a case where a cement cured object is filled into the space and shortening construction time corresponding thereto.

The mounting base is characterized in that a waterproof layer covering a foundation is included and a portion that externally extends from a second portion of a bottom plate of the waterproof layer is connected to a waterproof layer of a concrete floor. Even if the base is installed outside a steel structure, the waterproof layer can prevent water leakage inside a foundation, thereby preventing corrosion of the foundation or reduction in strength from water leakage inside the foundation. Also, this structure can prevent water leakage inside the concrete floor and degradation of the concrete floor and a steel skeleton therefrom.

The mounting base is characterized in that a fill hole for filling a cement cured object into a space between a top surface of a concrete floor and a bottom plate is prepared at a predetermined position of the bottom plate. The cement cured object can be filled into a space using the fill hole after fixing bolts to the bottom plate and the concrete floor to assuredly fill the cement cured object into the space. In the mounting base, the load on the base with a machine and equipment and a structure thereon can be borne by the support bolts, the anchor bolts and the cement cured object so that the base doesn't incline or collapse in an undesired manner by the load on the base to assuredly support the machine and equipment and the structure.

The mounting base is characterized in that a confirmation hole for confirming the state of a cement cured object filled into a space between a concrete floor and a bottom plate is prepared at a predetermined position of the bottom plate. The state of the cement cured object filled into the space using the confirmation hole is confirmed in order to fill the cement cured object into the space completely evenly. In the mounting base, the load on the base with a machine and equipment and a structure thereon can be borne by the support bolts, the anchor bolts and the cement cured object so that the base doesn't incline or collapse in an undesired manner by the load on the base to assuredly support the machine and equipment and the structure.

The mounting base is characterized in that height-adjusting bolts screwed into screwing holes opening a bottom plate that adjust the height dimension of a foundation are included and the base is capable of adjusting the height dimension of a space and adjusting the height dimension of the foundation from a concrete floor by adjusting a screwing position of the height-adjusting bolts relative to the bottom plate. The height dimension of the foundation can be changed during base construction and a requirement for changing the height dimension of the base can be promptly met by using the height-adjusting bolts. In the mounting base, the height dimension thereof can be readily adjusted and evenly determined when mounting a plurality of mounting bases.

BEST MODE FOR CARRYING OUT THE INVENTION

Figure 1:
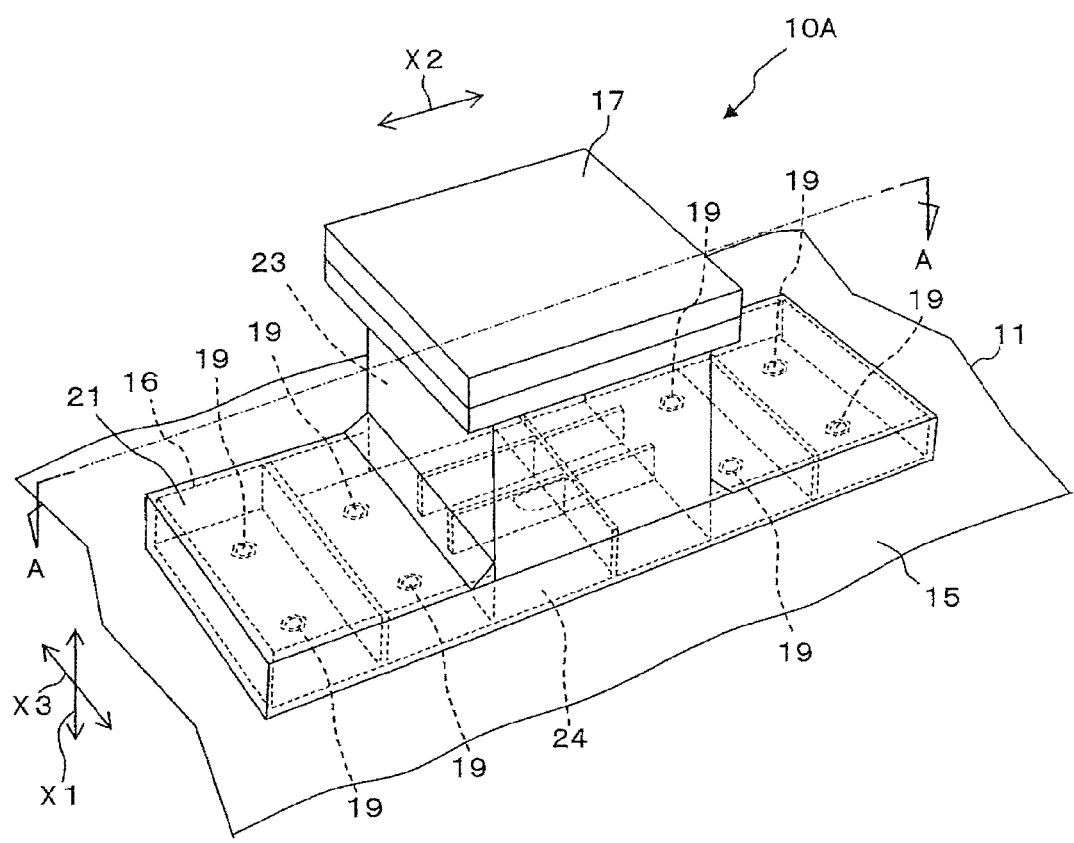
FIG. 1 is a perspective view of a mounting base showing one example.
Figure 2:
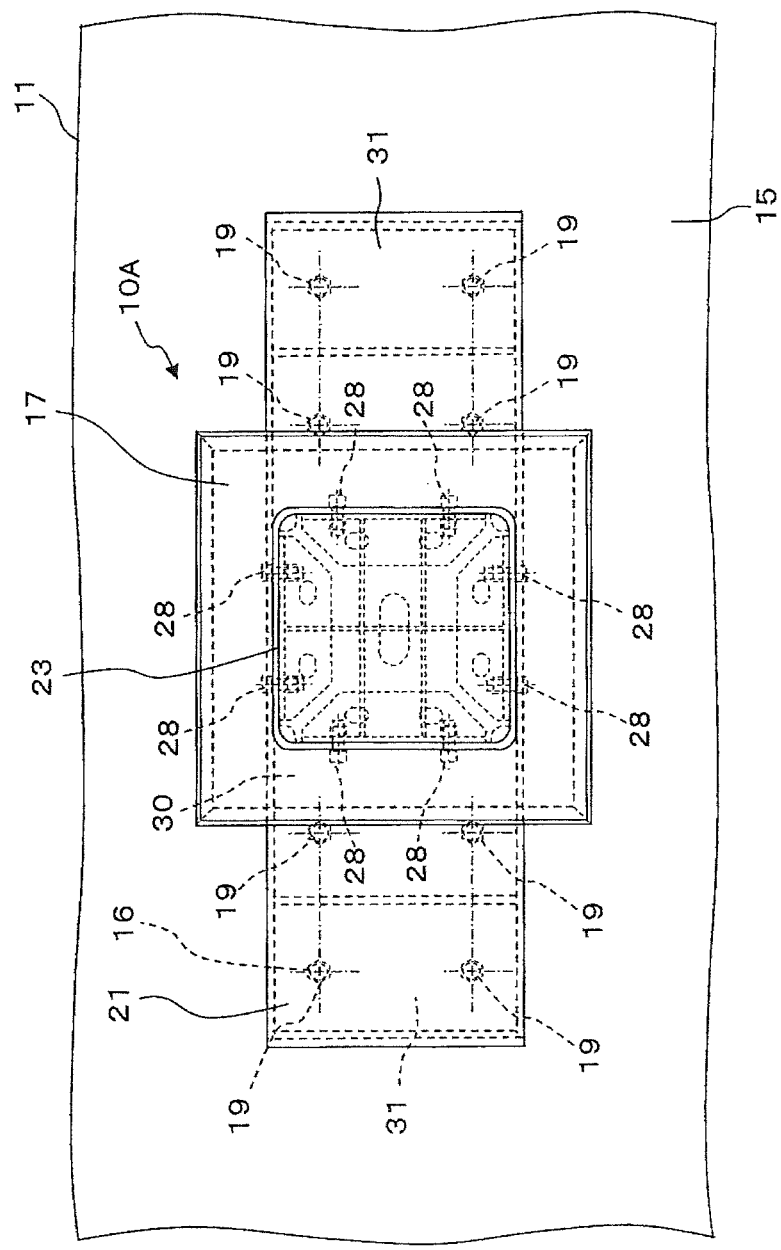
FIG. 2 is a diagram showing a top surface of a mounting base.

The mounting base of the present invention will be described in detail with reference to attached drawings such as FIG. 1 showing one example of a perspective view of a mounting base 10A. FIG. 1 shows one mounting base 10A installed on a steel structure 11, but the number of bases 10A installed is not limited to the one shown and generally 2 or more bases 10A are installed on the steel structure 11. FIG. 2 is a diagram showing a top surface of a mounting base 10A and FIG. 3 is a sectional view taken from line A-A, of FIG. 1.

Figure 4:
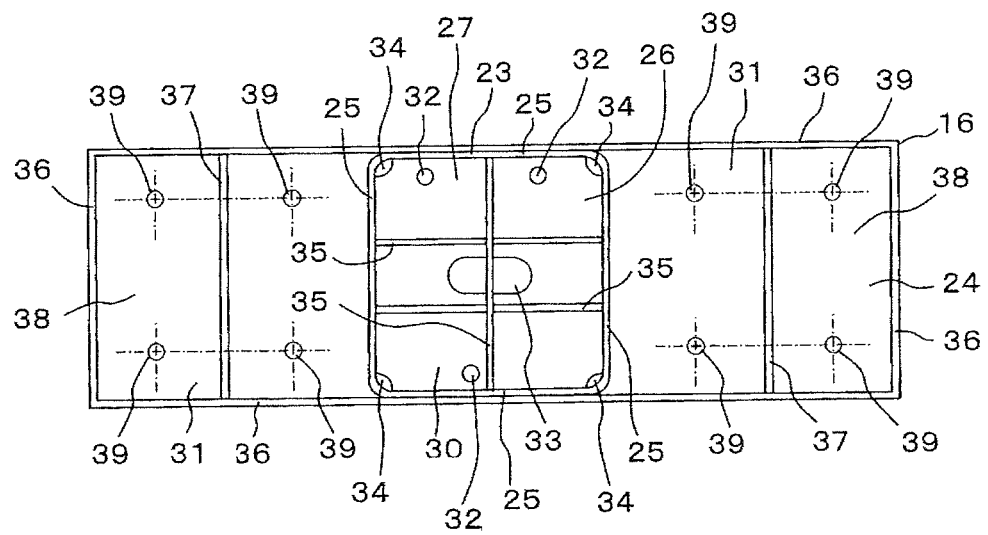
FIG. 4 is a diagram showing a top surface of a metal foundation.
Figure 5:
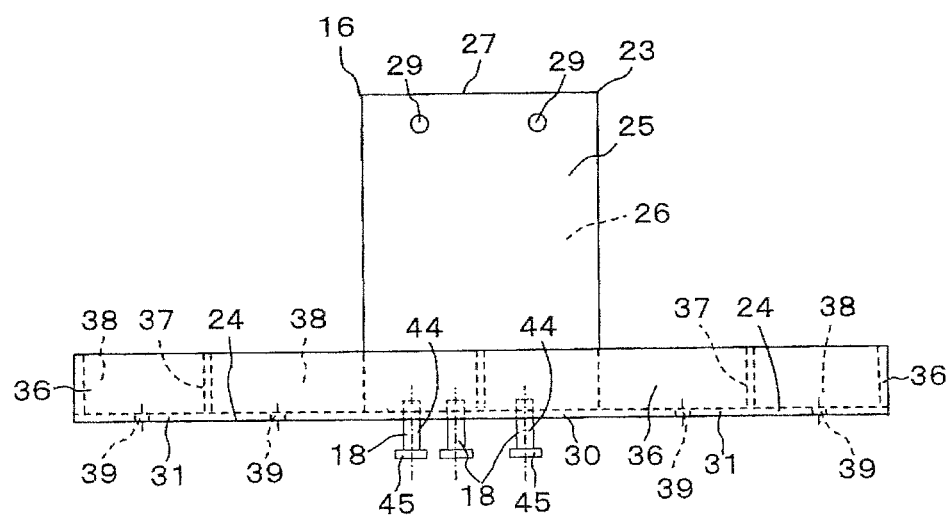
FIG. 5 is a side view of a metal foundation.

FIG. 4 is a diagram showing a top surface of a metal foundation 16 and FIG. 5 is a side view of a metal foundation 16. In the FIG. 1, arrow X1 represents a vertical direction, arrow X2 a lateral direction and arrow X3 a longitudinal direction.

The mounting base 10A is installed at a predetermined mounting position of a rooftop and underground part of a new or existing steel structure 11 (all types of steel structures including steel buildings). The mounting position is an intersecting position of a rooftop or underground steel column and steel beam. Herein, "slab" exactly means "floor slab," but in this embodiment, not only an underground floor of the steel structure 11, but also a rooftop floor thereof.

Figure 3:
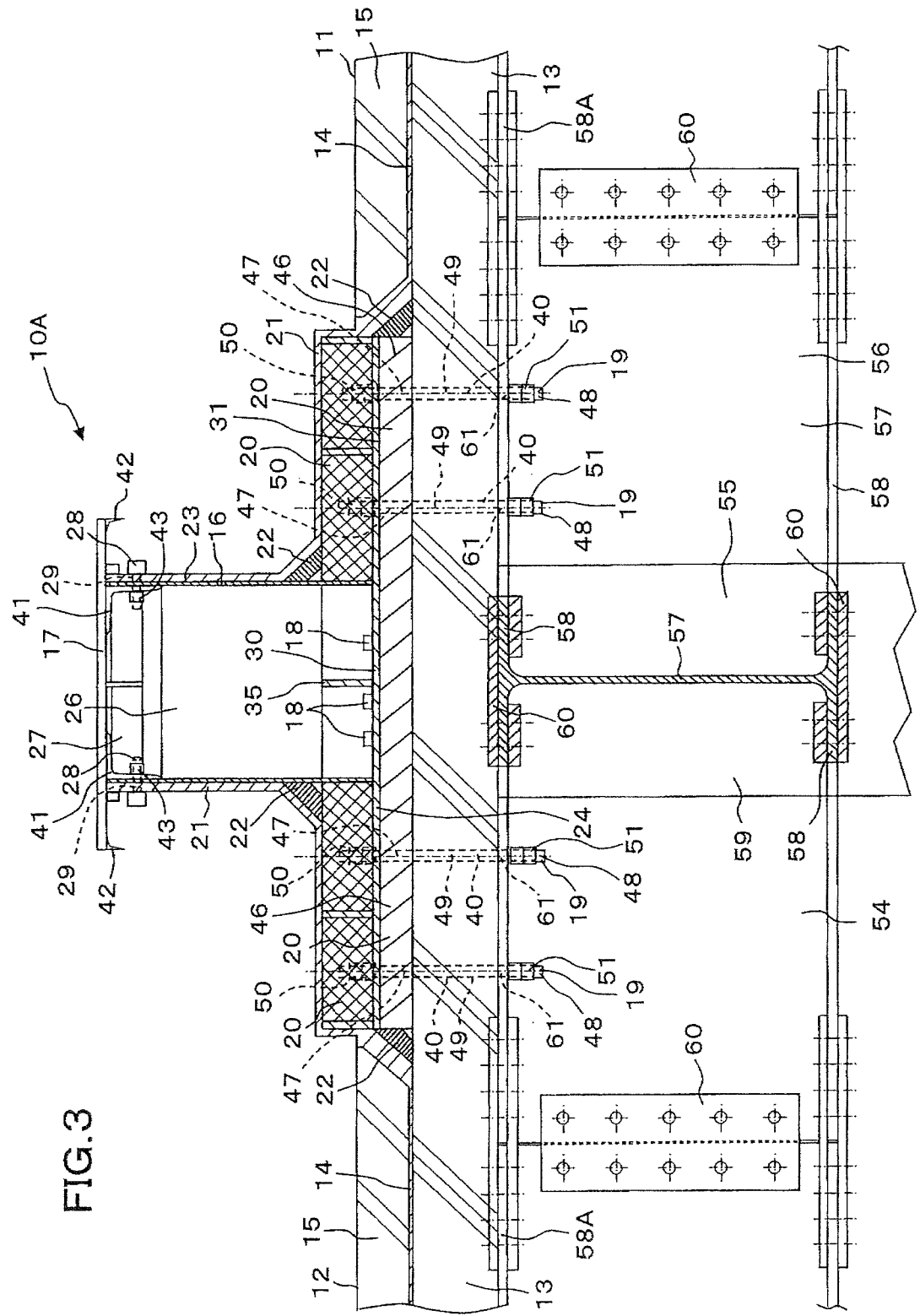
FIG. 3 is a sectional view taken from line A-A of FIG. 1.

The steel structure 11 on which the base 10A is installed is, as shown in FIG. 3, formed from a steel skeleton 54 and a concrete floor 12 provided on the steel skeleton 54. The steel skeleton 54 is formed from a steel column 55 and a steel beam 56. An H-shaped steel having a web 57 and a flange 58 is used in the steel column 55 and the steel beam 56. A concrete 59 is placed on an H-shaped steel of the steel column 55. The H-shaped steels are linked to each other with a connecting plate 60 fixed to the flange 58. Any of a square steel tube, an angle steel, a channel steel and a C-shaped steel can be used in the steel column 55 and the steel beam 56 in addition to an H-shaped steel.

The concrete floor 12 is formed from a concrete slab 13, a waterproof layer 14 provided on the concrete slab 13 and a covering concrete 15 (mortar layer) provided on the waterproof layer 14. When the steel structure 11 is constructed underground, it can be formed only from a concrete slab 13, without a waterproof layer 14 or a covering concrete 15. The concrete slab 13 is provided with a plurality of reinforcing bars (not shown) laid therein.

The mounting base 10A is installed on the concrete slab 13 obtained by removing the covering concrete 15 and the waterproof layer 14 from the concrete floor 12. The mounting base 10A employs each of general-purpose (standardized) base components including a metal foundation 16 (foundation), a metal cover 17 (cover), a plurality of height-adjusting bolts 18, a plurality of support bolts 19, a mortar 20 (cement cured object), a waterproof layer 21 and a molding material 22 (frame material) assembled according to a process using a specific manual.

An upper flange 58A of an H-shaped steel forming the steel beam 56 is provided with a plurality of support bolt insertion holes 61 (bolt hole) that insert the support bolts 19. The support bolt insertion holes 61 are provided using a drill, which vertically pass through the upper flange of an H-shaped steel 58A so that they don't contact with reinforcing bars laid in the concrete slab 13. The support bolt insertion holes 61 are aligned laterally and longitudinally at the upper flange 58A with a predetermined interval. The upper flange 58A is provided with 8 support bolt insertion holes 61, but the number of the insertion holes 61 is not particularly limited, but determined by structural calculation (strength calculation) prior to mounting of the base 10A.

The metal foundation 16 is a standardized general-purpose product of the same shape and size. After a plurality of metal foundations are produced at a base part manufacturing plant other than a construction site, they are carried to the construction site. The metal foundation 16 is disposed on the concrete slab 13 obtained by removing the covering concrete 15 and the waterproof layer 14 from the concrete floor 12. The metal foundation 16 is formed from a hollow tubular metal tube 23 (tubing material) and a metal plate 24 (bottom plate) with an approximately rectangular planar shape. The metal foundation 16 is produced by welding the metal tube 23 on a top surface of the metal plate 24. The metal tube 23 and the metal plate 24 are made of a metal such as iron, aluminum or alloy.

In the metal foundation 16, the metal tube 23 forming thereof (including a later-mentioned first portion 30 of the metal plate 24) is disposed just above the concrete slab 13 provided at an intersecting portion of the steel column 55 and the steel beam 56, and a later-mentioned second portion 31 of the metal plate 24 is disposed just above the concrete slab 13 provided on the steel beam. The metal foundation 16 is lighter than a reinforced concrete base, because a concrete portion is saved. Thus, the weight of the base 10A can be significantly reduced using the metal foundation 16.

The metal tube 23 has each side plate 25 in an approximately rectangular shape, and the section is formed in an approximately quadrangular shape. The metal tube 23 is disposed on a top surface in the middle of the metal plate 24, and a lower end edge thereof is welded to the top surface of the metal plate 24 to be jointed (fused together). In the metal tube 23, a hollow space 26 is partitioned by a side wall 25 thereof and a top of the metal tube 23 is formed from an opening 27 surrounded by upper end edges of the side plates 25. The top of the metal tube 23 is provided with a plurality of fixing bolt screwing holes 29 that screw cover fixing bolts 28. The fixing bolt screwing holes 29 are provided with female screws (not shown) that screw the cover fixing bolts 28.

The metal plate 24 has a first portion 30 that internally extends in a radial direction from a lower end edge of the metal tube 23 (or that internally extends in a lateral direction of the metal tube 23) and a second portion that externally extends in a radial direction from a lower end edge of the metal tube 23 (or that externally extends in a lateral direction of the metal tube 23). The first portion 30 is provided with a plurality of adjusting bolt screwing holes 32 that screw the height-adjusting bolts 18 (FIG. 4). The adjusting bolt screwing holes 32 are provided with female screws (not shown) screwed by the height-adjusting bolts 18. The number and boring position of the bolt screwing holes 32 at the first portion 30 are not particularly limited and the adjusting bolt screwing holes 32 can be provided at any position of the first portion 30.

The metal plate 24 is provided with an elliptical fill hole 33 for filling a mortar 20 in the middle of the first portion 30 thereof. Four corners of the first portion 30 are provided with a confirmation hole 34 for confirming the state of the mortar 20 filled (FIG. 4). The first portion 30 is provided with a plurality of reinforcing plates 35 that extend in lateral and longitudinal directions. The reinforcing plates 35 are welded to an inner surface of the metal tube 23 and a top surface of the metal plate 24 to be jointed (fused together). The reinforcing plate 35 serves as a reinforcing material that increases the strength of the metal tube 23 and the metal plate 24.

The second portion 31 of the metal plate 24 has a both end edge (circumferential edge) that laterally extends and a both side edge (circumferential edge) that longitudinally extends. Rectangular first side plates 36 that upwardly stand from an end edge along a both end edge thereof are welded to the second portion 31 to be jointed (fused together) and rectangular first side plates 36 that upwardly stand from a side edge along a both side edge thereof are welded to the second portion 31 to be jointed (fused together). The first side plates 36 linked to end edges of the second portion 31 (including the first portion 30) laterally extend parallel to one another. The first side plates 36 linked to side edges of the second portion 31 longitudinally extend parallel to one another.

Rectangular second side plates 37 positioned between the first side plates 36 that upwardly stand from the second portion 31 are welded to the second portion 31 of the metal plate 24 to be jointed (fused together). The second side plates 37 longitudinally extend parallel to one another. The first and second side plates 36, 37 serve as a reinforcing plate that increases the strength of the second portion 31 of the metal plate 24. A space 38 surrounded by the second portion 31 of the metal plate 24 and the first side plates 36 is partitioned on the metal foundation 16. The space 38 is filled with the mortar 20 (cement cured object), which is cured into the space 38 (FIG. 3). A metal top plate (not shown) is disposed on a top surface of the second portion 31 of the metal plate 24, and the top plate may block an opening of the space 38. In this case, the mortar 20 is not filled into the space 38, and the top plate is welded to an upper end edge of the first and second side plates 36, 37 to be jointed (fused together).

The second portion 31 of the metal plate 24 is provided with a plurality of support bolt insertion holes 39 (bolt hole) that insert the support bolts 19. The support bolt insertion holes 39 are provided using a drill, which vertically pass through the second portion 31 of the metal plate 24. The support bolt insertion holes 39 are aligned laterally and longitudinally at the second portion 31 with a predetermined interval. FIG. 4 shows 8 support bolt insertion holes 39 provided, but the number of support bolt insertion holes 39 is not particularly limited, but determined according to structural calculation (strength calculation) prior to mounting of the base 10A.

A position for installing a base of the concrete slab 13 is provided with a plurality of support bolt insertion holes 40 (bolt hole) that insert the support bolts 19. The support bolt insertion holes 40 are provided using a drill, which vertically pass through the concrete slab 13 so that they don't contact with reinforcing bars laid in the concrete slab 13. The support bolt insertion holes 40 are positioned at the support bolt insertion holes 39 formed at the second portion 31 of the metal plate 24 when the metal foundation 16 is placed on a top surface of the concrete slab 13. The support bolt insertion holes 40 are aligned vertically and longitudinally at the concrete slab 13 with a predetermined interval.

The metal cover 17 is a standardized general-purpose product of the same shape and size. After a plurality of metal covers 17 are produced at a base part manufacturing plant other than a construction site, they are carried to the construction site. The metal cover 17 is made of a metal such as iron, aluminum and alloy, and a planar shape thereof is made in an approximately rectangular shape. On an undersurface of the metal cover 17 or inside a circumferential edge of the cover 17 is an angle bar 41 (steel material) for fixing the cover 17 to a top of the metal tube 23 welded to be jointed (fused together). On an undersurface of the metal cover 17 and a circumferential edge of the cover 17 is a drain angle bar 42 (steel material) welded to be jointed (fused together). The angle bar 41 is provided with fixing bolt insertion holes (not shown) that insert cover fixing bolts 28, and hexagonal nuts 43 are welded to the fixing bolt insertion holes to be jointed (fused together).

The metal cover 17 is fixed to a top of the metal tube 24 by the cover fixing bolts 28 inserted into the fixing bolt insertion holes provided at the angle bar 41 and the hexagonal nuts 43 attached to the angle bar 41 to block the opening 27 of the metal tube 24 in a watertight manner. The top surface of the metal cover 17 is provided with a fixed apparatus for installing a solar panel, an antenna, a water tank, a septic tank, and a mechanical appliance such as an air-conditioning apparatus, a structure such as a steel tower and a steel building (not shown).

The height-adjusting bolts 18 are hexagon head bolts formed from a threaded shaft 44 having a male screw (not shown) provided and a bolt head 45. The threaded shaft 44 of the height-adjusting bolts 18 is screwed beforehand into the adjusting bolt screwing holes 32 provided at the first portion 30 of the metal plate 24. In the bolt head 45, as the height-adjusting bolts 18 are rotated counterclockwise, the threaded shaft 44 of the bolts 18 slowly advances toward the bolt screwing holes 32 downwardly and downwardly extends from an undersurface of the first portion 30 to make the bolt head 45 abut against a top surface of the concrete beam 13. Accordingly, the metal foundation 16 can be spaced away from a top surface of the concrete slab 12 and the concrete beam 13 upwardly with a predetermined dimension. Conversely, as the height-adjusting bolts 18 are rotated clockwise, the threaded shaft 44 of the bolts 18 slowly advances toward the bolt screwing holes 32 upwardly and upwardly extends from an undersurface of the first portion 30. Accordingly, the metal foundation 16 can be closer to a top surface of the concrete slab 12 and the concrete beam 13.

As the height-adjusting bolts 18 are rotated in the adjusting bolt screwing holes 32, the metal plate 24 of the metal foundation 16 is upwardly spaced away from a top surface of the concrete slab 12 and the concrete beam 13, and a space 46 is formed with a predetermined height dimension between a top surface of the concrete slab 12 and the beam 13 and an undersurface of the metal plate 24. By adjusting the screwing position of the height-adjusting bolts 18 relative to the first portion 30 of the metal plate 24 of the metal foundation 16, the height dimension of the space 46 can be adjusted and the height dimension of the metal foundation 16 from a top surface of the concrete slab 12 and the concrete beam 13 can be adjusted within the length of the bolt 18.

The support bolts 19 are standardized general-purpose products of the same length and diameter. After a plurality of support bolts are produced at a base part manufacturing plant other than a construction site, they are carried to the construction site. The bolts 19 are made of a steel material, and are inserted into the support bolt insertion holes 39 provided at the second portion 31 of the metal plate 24, inserted into the support bolt insertion holes 40 provided on the concrete slab 13 (concrete floor) and inserted into the support bolt insertion holes 61 provided at an upper flange 58A of an H-shaped steel. The support bolts 19 have first fixed ends 47 that upwardly extend from a top surface of the concrete slab 13, second fixed ends 48 that downwardly extend from the upper flange 58A of the H-shaped steel and an intermediate portion 49 positioned in the support bolt insertion holes 40, 61 that extends between the first and second fixed end 47, 48.

The first fixed end 47 of the support bolts 19 are inserted into the support bolt insertion holes 39 opening the metal plate 24 and fixed to the metal plate 24 with hexagonal double nuts 50 (fixing means). The hexagonal double nuts 50 are attached to a portion of the first fixed end 47 that upwardly extends from the metal plate 24. The second fixed end 48 of the support bolts 19 are fixed to an upper flange 58A of the H-shaped steel with hexagonal double nuts 51 (fixing means). When the hexagonal double nuts 50, 51 are screwed into the fixed ends 47, 48 of the support bolts 19, the height dimension of the metal foundation 16 from a top surface of the concrete slab 12 and the concrete beam 13 is already adjusted by the height-adjusting bolts 18.

The mortar 20 is filled into a space 46 formed between a top surface of the concrete slab 13 and an undersurface of the metal plate 24. The mortar 20 is filled from the fill hole 33 formed on the metal plate 24. The mortar 20 filled into the space 46 is cured and the mortar 20 is jointed to a top surface of the concrete slab 13 and an undersurface of the first and second portions 30, 31 of the metal plate 24 and to the support bolts 19.

In the space 46, a portion of the first fixed end 47 of the support bolts 19 that extends between a top surface of the concrete slab 13 and the second portion 31 of the metal plate 24 is integrated with the mortar 20. The cured mortar 20 bears the load on the base 10A (on the metal cover 17) with a solar panel, an antenna, a water tank, a septic tank, and a mechanical appliance such as an air-conditioning apparatus, a structure such as a steel tower and a steel building thereon together with the support bolts 19. As a cement cured object filled into the space 46, concrete can be used in addition to the mortar 20.

A trigonal prism-shaped molding material 22 (frame material) is provided at an intersecting portion of the metal tube 23 and the metal plate 24. The molding material 22 is secured to the metal tube 23 and the metal plate 24 with an adhesive agent (not shown) to surround the whole outer circumferential edge of the metal tube 23. The covering concrete 15 and the concrete slab 13 are provided with a trigonal prism-shaped molding material 22 (frame material). The molding material 22 is secured to the concrete slab 13 and the covering concrete 15 with an adhesive agent (not shown). The molding material 22 is provided between an outer circumferential edge of the metal foundation 16 (an outer circumferential edge of the metal plate 24) and the concrete slab 13 (the concrete floor) to surround the whole outer circumferential edge of the metal plate 24 and block a gap between the concrete slab 13 and an outer circumferential edge of the metal plate 24.

The waterproof layer 21 is provided outside each side plate 25 of the metal tube 23 to cover the whole side plate 25, and provided outside the metal plate 24 (on a top surface of the mortar 20 filed into the space 38 or a top surface of a top plate blocking the space 38) to cover the whole metal plate 24 and the whole first and second side plate 36, 37. The waterproof layer 21 is employed as an asphalt waterproof that forms asphalt sheet layers by laminating a plurality of thin asphalt sheets. The asphalt sheets are secured to the side plate 25 of the metal tube 23, the mortar 20, the first and second side plates 36, 37 and the molding material 22 with each distinct adhesive property. A portion that externally extends from the second portion 31 of the metal plate 24 of the waterproof layer 21 (an asphalt sheet secured to the molding material 22) is connected to the waterproof layer 14 of the steel structure 11. As the waterproof layer 21, vinyl chloride sheet waterproof, rubber sheet waterproof, urethane waterproof, epoxy waterproof, or FRP waterproof can be used in addition to the asphalt waterproof.

Figure 6:
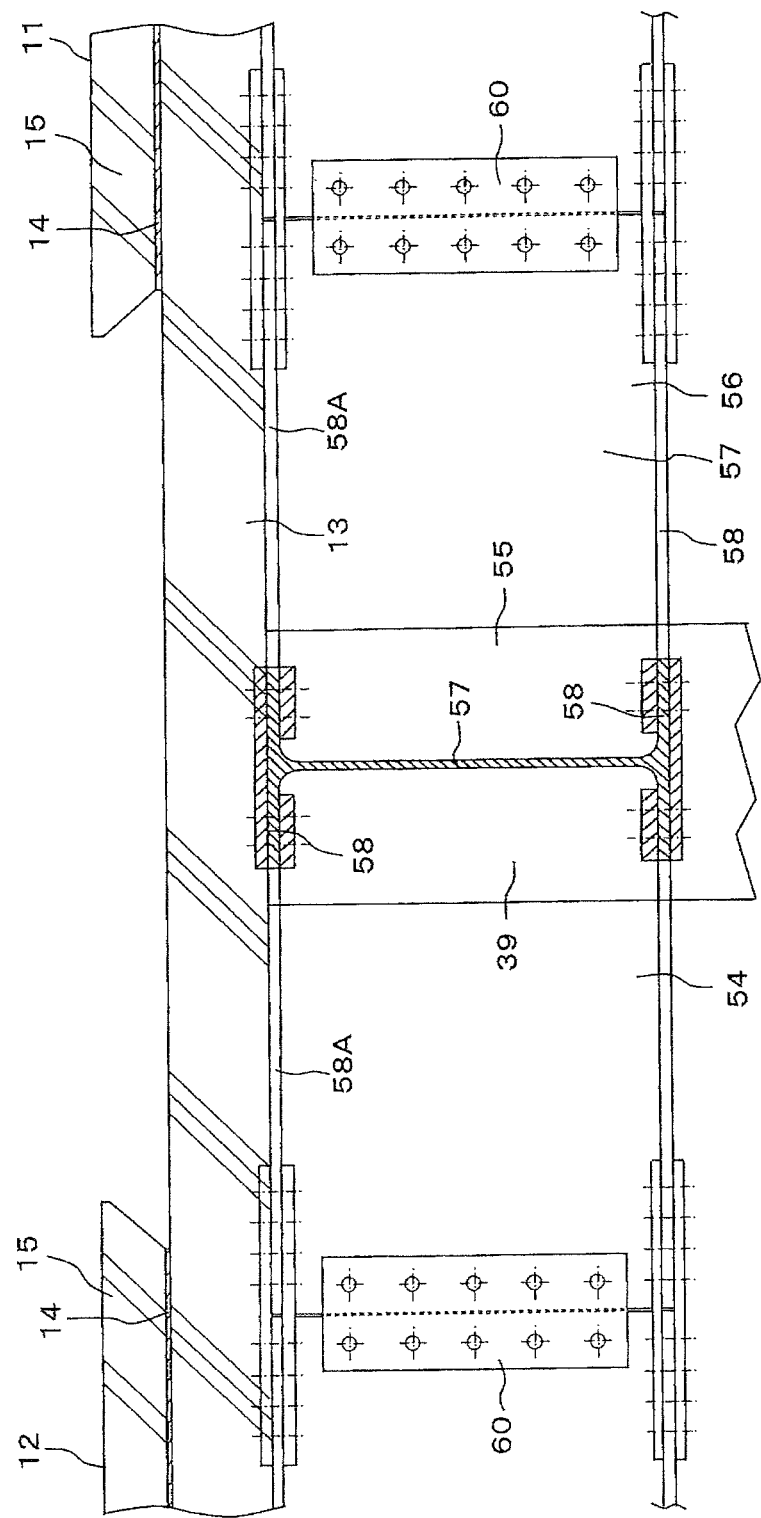
FIG. 6 is a diagram showing one example of a construction process of a mounting base.
Figure 7:
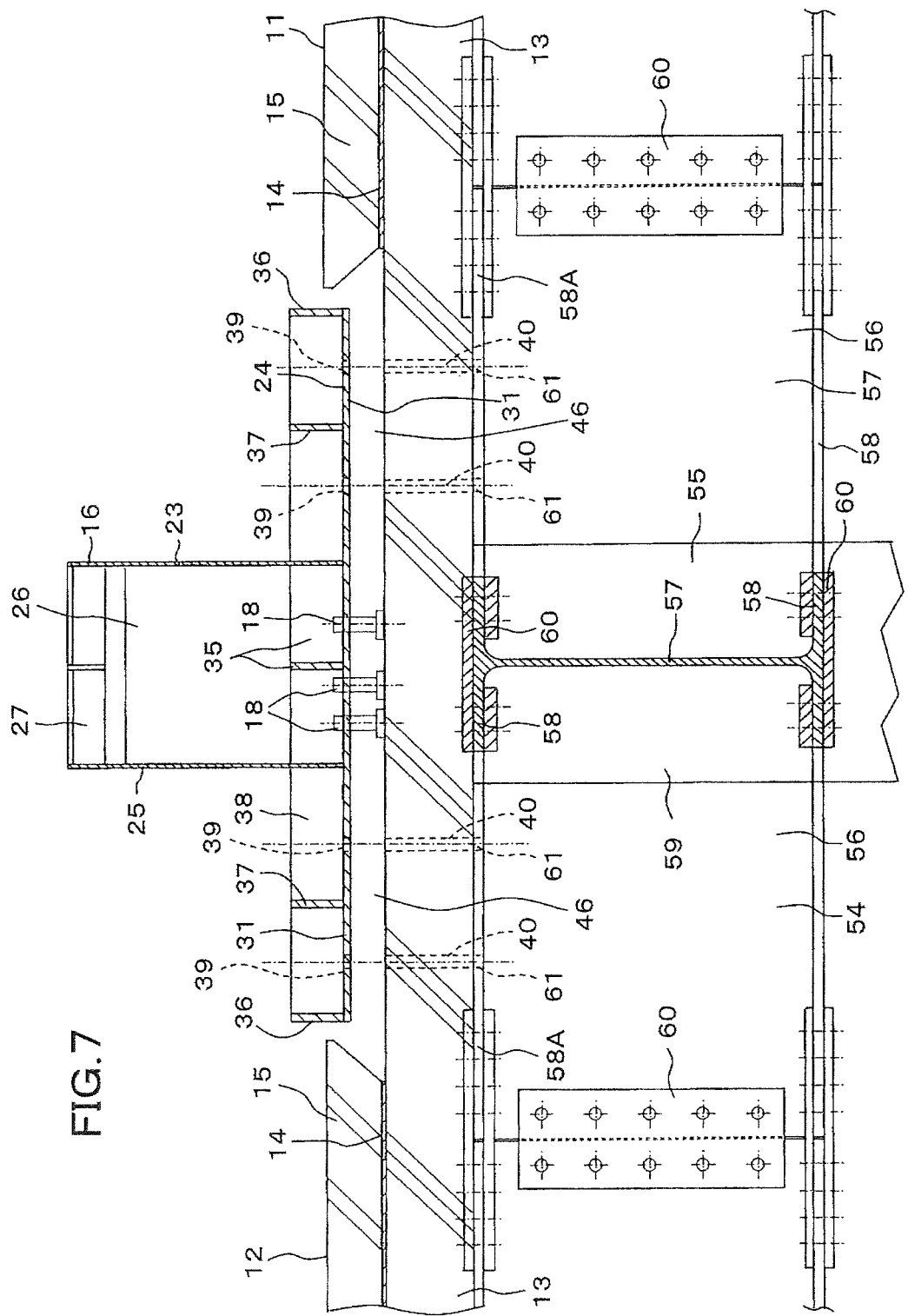
FIG. 7 is a diagram showing a construction process of a mounting base following FIG. 6.
Figure 8:
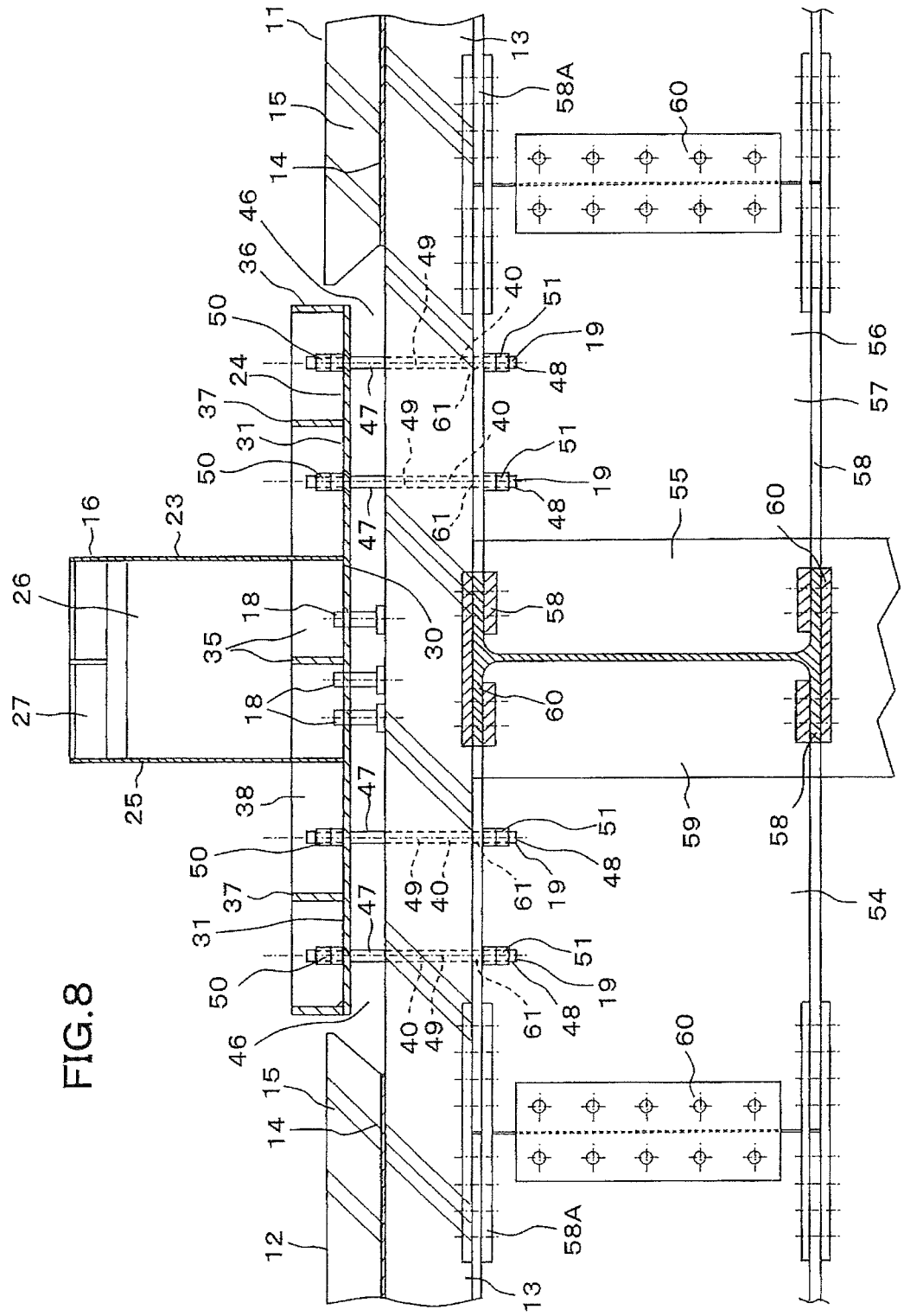
FIG. 8 is a diagram showing a construction process of a mounting base following FIG. 7.
Figure 9:
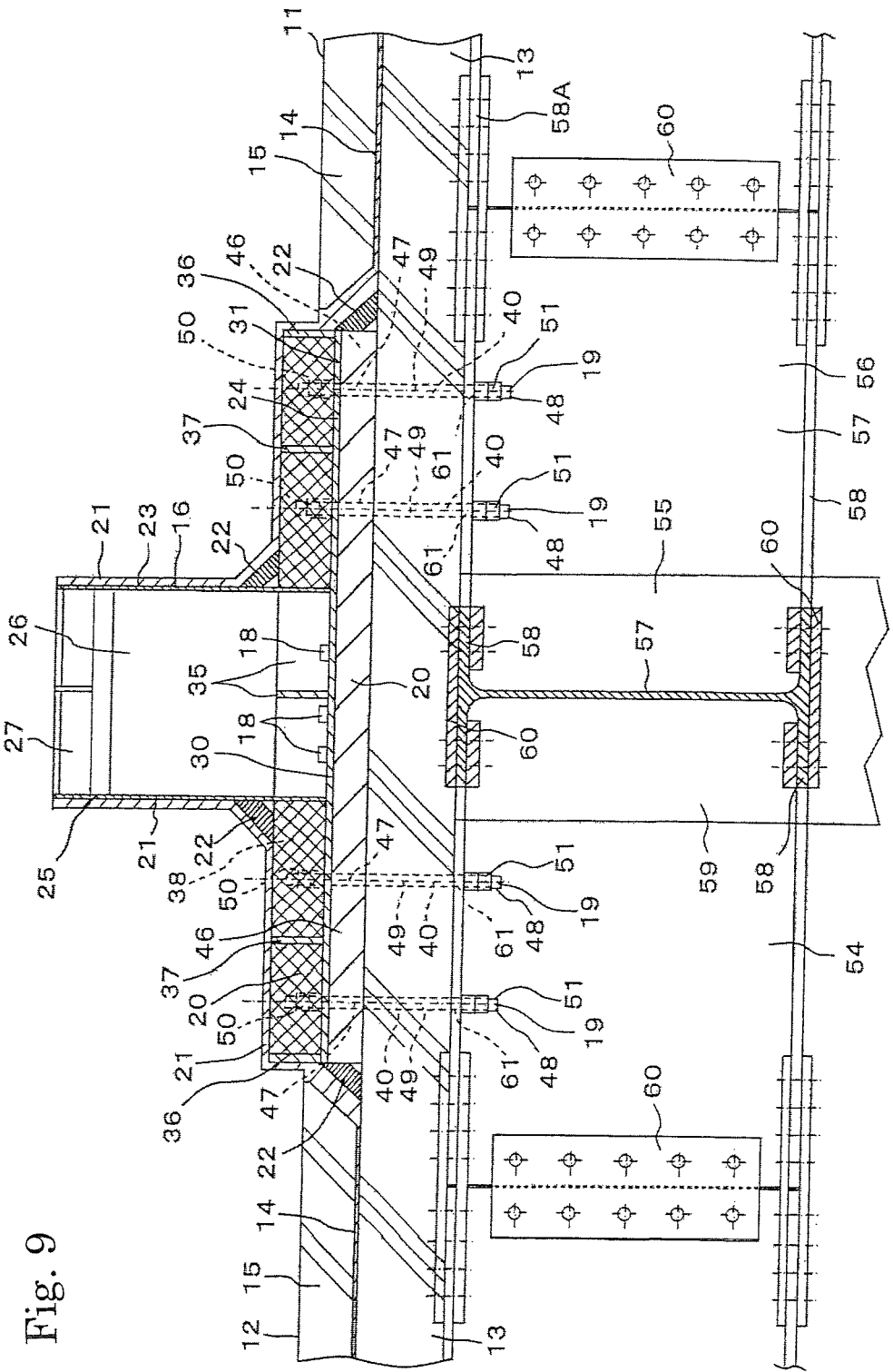
FIG. 9 is a diagram showing a construction process of a mounting base following FIG. 8.

FIG. 6 is a diagram showing one example of a construction process of a mounting base 10A, and FIG. 7 is a diagram showing a construction process of a mounting base 10A following FIG. 6. FIG. 8 is a diagram showing a construction process of a mounting base 10A following FIG. 7, and FIG. 9 is a diagram showing a construction process of a mounting base 10A following FIG. 8. FIGS. 6 to 9 show a steel structure 11 as a section, and each component of the base 10A (not all components) as a section. A construction process of the base 10A will be described as follows with reference to FIGS. 6 to 9 in cases where the mounting base 10A is installed on a rooftop of the steel structure 11.

Each general-purpose base component produced at a base part manufacturing plant (a metal foundation 16 (foundation), a metal cover 17 (cover), height-adjusting bolts 18, support bolts 19, a waterproof layer 21 and a molding material 22 (frame material)) is carried from the plant to a construction site. Upon shipping from the base part manufacturing plant, support bolt insertion holes 39 (bolt hole) are not provided at a second portion 31 of a metal plate 24, and the support bolt insertion holes 39 are bored at the second portion 31 at the construction site. A plurality of adjusting bolt screwing holes 32 are provided beforehand at the first portion 30 of the metal plate 24 at the base part manufacturing plant, and the height-adjusting bolts 18 are screwed into the bolt screwing holes 32.

The rooftop steel structure 11 is, as shown in FIG. 6, formed from a steel column 55, a steel beam 56 (a steel skeleton 54), a concrete slab 13, a waterproof layer 14 provided on the concrete slab 13 and a covering concrete 15 provided on the waterproof layer 14. First, the mounting position of the base 10A on the rooftop steel structure 11 is determined and marked, and as shown in FIG. 6, the covering concrete 15 and the waterproof layer 14 are removed from the concrete floor 12 at the mounting position to expose the concrete slab 13.

The concrete floor 12 shown in the figure is formed from the concrete slab 13, the waterproof layer 14 and the covering concrete 15, but it is not limited to the one shown and the mounting base 10A can be constructed on all concrete structures of other configurations currently used. For instance, when a concrete floor is formed from a resin coating film by further applying a synthetic resin on a concrete slab, the resin coating film, a covering concrete and a waterproof layer are removed from the concrete floor at a base mounting position to expose the concrete slab.

After exposing the concrete slab 13 from the concrete floor 12, the position of reinforcing bars installed inside the concrete slab 13 is measured using a sensor. Subsequently, since the support bolts 19 are installed so that they doesn't contact with the reinforcing bars, the boring position off the reinforcing bars of the support bolt insertion holes 39 (bolt hole) is marked at the second portion 31 of the metal plate 24. With reference to marked positions, the support bolt insertion hole 39 are bored at the boring position of the second portion 31 of the metal plate 24 using a drill (insertion hole boring process). After the bolt insertion holes 39 are bored, as shown in FIG. 7, with reference to marked base mounting positions on the concrete slab 13, the metal foundation 16 is temporarily installed at the mounting positions (foundation temporarily installing process).

In the foundation temporarily installing process, when the metal foundation 16 is temporarily installed, the metal tube 23 and the first portion 30 of the metal plate 24 are positioned just above the concrete slab 13 provided at an intersecting portion of the steel column 55 and the steel beam 56, and the second portion 31 of the metal plate 24 is positioned just above the concrete slab 13 provided on the steel beam 56 to make a bolt head 45 of the height-adjusting bolts 18 abut against a top surface of the concrete slab 13. When the metal foundation 16 is temporarily installed at the mounting position, the foundation 16 stands by itself on a top surface of the concrete slab 13 by being supported by the height-adjusting bolts 18 that abut against a top surface of the concrete slab 13.

After the metal foundation 16 is temporarily installed, screwing positions of the height-adjusting bolts 18 relative to the first portion 30 of the metal plate 24 of the foundation 16 are adjusted and the installation height of the foundation 16 from a top surface of the concrete slab 13 (height dimension) (height dimension of a space 46) is adjusted (installation height adjusting process). In the installation height adjusting process, as shown in the description of the height-adjusting bolts 18, as the adjusting bolts 18 are rotated clockwise or counterclockwise in the adjusting bolt screwing holes 32, the dimension spaced away from a top surface of the concrete slab 13 of the metal foundation 16 is adjusted.

In the mounting base 10A, the height dimension of the metal foundation 16 can be changed during construction of the base 10A using the height-adjusting bolts 18, and a requirement for changing the height dimension of the base 10A can be promptly met. In the mounting base 10A, when a plurality of mounting bases are installed, the height dimension of the bases 10A can be readily adjusted and evenly determined.

After adjusting the height dimension of the metal foundation 16, boring positions of support bolt insertion holes 40 (bolt hole) of the concrete slab 13 are marked with reference to positions of the support bolt insertion holes 39 of metal plate 24. Subsequently, after the metal foundation 16 is temporarily retreated from the temporarily installed position (mounting position), the support bolt insertion holes 40 are bored at boring positions marked with a drill (insertion hole boring process) and support bolt insertion holes 61 are bored at an upper flange 58A of an H-shaped steel with reference to positions of the support bolt insertion holes 39 (bolt hole boring process). After providing the support bolt insertion holes 40, 61 on the concrete slab 13 and the upper flange 58A, as shown in FIG. 8, the support bolts 19 are inserted into the support bolt insertion holes 39 provided at the second portion 31 of the metal plate 24 and the support bolts 19 are inserted into the support bolt insertion holes 40 provided on the concrete slab 13, and the support bolts 19 are inserted into the support bolt insertion holes 61 provided on the upper flange 58A.

As the support bolts 19 are inserted into the support bolt insertion holes 39, 40, 61, first fixed ends 47 upwardly extend from a top surface of the concrete slab 13 and second fixed ends 48 downwardly extend from the upper flange 58A, and an intermediate portion 49 is positioned in the support bolt insertion holes 40, 61. Subsequently, hexagonal double nuts 50 are screwed into a portion of the first fixed ends 47 of the support bolts 19 that upwardly extends from the metal plate 24 and hexagonal double nuts 51 are screwed into the second fixed ends 48 of the support bolts 19, and the support bolts 19 are fixed to the metal plate 24 and the upper flange 58A of the H-shaped steel (support bolt fixing process).

After the support bolts 19 are fixed to the metal plate 24 and the upper flange 58A, and as shown in FIG. 9, a mortar 29 (cement cured object) is filled into a space 38 surrounded by the second portion 31 of the metal plate 24 and the first side plates 36 to cure a mortar 20. To save a curing period of the mortar 20, a metal top plate (not shown) is disposed on a top surface of the second portion 31 of the metal plate 24 instead of the mortar 20 to block an opening of the space 38 with its top plate. In this case, the mortar 20 is not filled into the space 38 and the top plate is welded to an upper end edge of first and second side plates 36, 37 to be jointed (fused together).

After the mortar 20 is cured or the opening of the space 38 is blocked with the top plate, the trigonal prism-shaped molding material 22 is provided at an intersecting portion of the metal tube 23 and the metal plate 24, and the molding material 22 is secured to the metal tube 23 and the metal plate 24 with an adhesive agent (not shown). In addition, trigonal prism-shaped molding materials 22 are installed on the covering concrete 15 and the concrete slab 13, and the molding material 22 is secured to the covering concrete 15 and the concrete slab 13 with an adhesive agent (not shown) (frame material installing process). When the molding material 22 is installed at an intersecting portion of the metal tube 23 and the metal plate 24, the molding material 22 surrounds the whole outer circumferential edge of the metal tube 23. When the molding material 22 is installed on the covering concrete 15 and the concrete slab 13, the molding material 22 surrounds the whole outer circumferential edge of the metal plate 24, and the molding material 22 blocks a gap between the concrete slab 13 and an outer circumferential edge of the metal plate 24.

After the molding material 22 is installed, the waterproof layer 21 is installed outside each side plate 25 of the metal tube 23 and outside the metal plate 24 (on a top surface of the mortar 20 filled into the space 38 or a top surface of the top plate blocking the space 38) (waterproof layer installing process). In the waterproof layer installing process, a plurality of thin asphalt sheets are secured outside each side plate 25 of the metal tube 23, outside the metal plate 24 and outside the molding material 22 to provide the waterproof layer 21, and the waterproof layer 21 that extends from the molding material 22 is connected to the waterproof layer 14 of the concrete floor 12. Even if the mounting base 10A is installed outside the steel structure 11, the waterproof layer 21 can prevent water leakage inside the metal foundation 16 and prevent the foundation 16 from corroding and decreasing the strength. Also, the waterproof layer 21 can prevent water leakage inside the concrete floor 12 (concrete slab 13) and degradation of the steel structure 11 therefrom.

After the waterproof layer 21 is installed, the mortar 20 (cement cured object) is filled into a space 46 formed between a top surface of the concrete slab 13 and an undersurface of the metal plate 24 (cement cured object filling process). In the cement cured object filling process, the state of the mortar 20 filled into the space 46 is confirmed from a confirmation hole 34 to fill the mortar 20 into the space 46 from the fill hole 33.

In the mounting base 10A, since the mortar 20 can be filled into the space 46 using the fill hole 33 after fixing the support bolts 19 to the metal plate 24 and the upper flange 58A, the mortar 20 can be assuredly filled into the space 46. In the mounting base 10A, the state of the mortar 20 filled into the space 46 is confirmed using a confirmation hole 34 to fill the mortar 20 into the space 46 completely evenly.

Just after filling the mortar 20 into the space 46, the metal cover 17 is immediately fitted into a top of the metal tube 23 to block an opening 27 of the metal tube 23 prior to completion of a curing period of the mortar 20. After the metal cover 17 is fitted into the top of the metal tube 23, cover fixing bolts 28 are screwed into fixing bolt screwing holes 29 provided at an upper portion of each side plate 25 of the metal tube 23 and bolts 29 are inserted into cover fixing bolt insertion holes of the angle bar 41 of the metal cover 17, and the bolts 29 are screwed into hexagonal nuts 43 provided in bolt insertion holes to fix the cover 17 to a top of the metal tube 25 (top closing process) (FIG. 3 assisted). An opening 27 of the metal tube 25 is blocked by the metal cover 17 in a watertight manner.

In fact, since the gap (a circumferential edge of the space 46) is blocked by the molding material 22, the molding material 22 serves as a bank that prevents the leakage of a pre-cured mortar 20, and the mortar 20 filled into the space 46 shows no leakage from the gap (the space 46), and the opening 27 can be blocked by the metal cover 17 just after filling the mortar 20. In the mounting base 10A, the mortar 20 filled into the space 46 just after fitting the metal cover 17 into a top of the metal tube 25 (or fixing) is pre-cured and a curing period of the mortar 20 starts after the cover 17 is fixed to the top of the tube 25.

In the space 46, the mortar 20 filled therein is cured after completion of a curing period of the mortar 20, a portion of the first fixed ends 47 of the support bolts 19 that extends between a top surface of the concrete beam 13 (concrete skeleton 13) and the metal plate 24 of the metal tube 25 (a portion of the first fixed ends 47 of the support bolts 19 that is downwardly exposed from an undersurface of the metal plate 24) is integrated with the mortar 20 to form a reinforced mortar.

After each of the above processes is completed, the mounting base 10A shown in FIGS. 1 to 3 is completed. In the mounting base 10A, the opening 27 of the metal tube 23 can be immediately blocked by the metal cover 17 to complete the base 10A after filling the mortar 20 into the space 46 and prior to completion of a curing period of the mortar 20, thereby shortening construction time corresponding to the curing period of the mortar 20 filled into the space 46 and constructing a plurality of bases 10A prior to completion of the curing period.

In the mounting base 10A, the base 10A can be constructed only by fixing a plurality of support bolts 19 to the second portion 31 of the metal plate 24 of a light metal foundation 16 and the steel beam 56 (an upper flange 58A of an H-shaped steel), filling the mortar 20 into the space 46 and fixing the metal cover 17 to a top of the metal tube 23. All of these general-purpose components are assembled in unit construction system, thereby saving work, cost and time required for producing a framework and curing a mortar, simplifying construction work and significantly shortening construction time required therefor.

In the mounting base 10A, even if the mounting position is on the concrete slab 13 having a waterproof layer provided with a waterproof function on a rooftop and underground part of an existing steel structure 11, the base 10A is installed on the concrete slab 13 exposed after removing the waterproof layer 14 at the mounting position, and the waterproof layer near the mounting position can be repaired (a new waterproof layer 21 can be provided) just after installing the base 10A, thereby promptly installing the base 10A and significantly reducing time required for installing the base 10A.

In the mounting base 10A, the first fixed ends 47 of the support bolts 19 are fixed to the second portion 31 of the metal plate 24 and the second fixed ends 48 of the support bolts 19 are fixed to the steel beam 56 (an upper flange 58A of an H-shaped steel), thereby firmly installing the base 10A to the steel structure 11 and firmly installing a solar panel, an antenna, a water tank, a septic tank, and a mechanical appliance such as an air-conditioning apparatus, a structure such as a steel tower and a steel building thereon. In the mounting base 10A, the mortar 20 is filled into the space 46 between a top surface of the concrete slab 13 and an undersurface of the metal plate 24, and the load on the base 10A with a machine and equipment and a structure thereon is borne by the support bolts 19 and the mortar 20 so that the base doesn't incline or collapse in an undesired manner by the load of the base 10A to assuredly support the machine and equipment and the structure.

Figure 10:
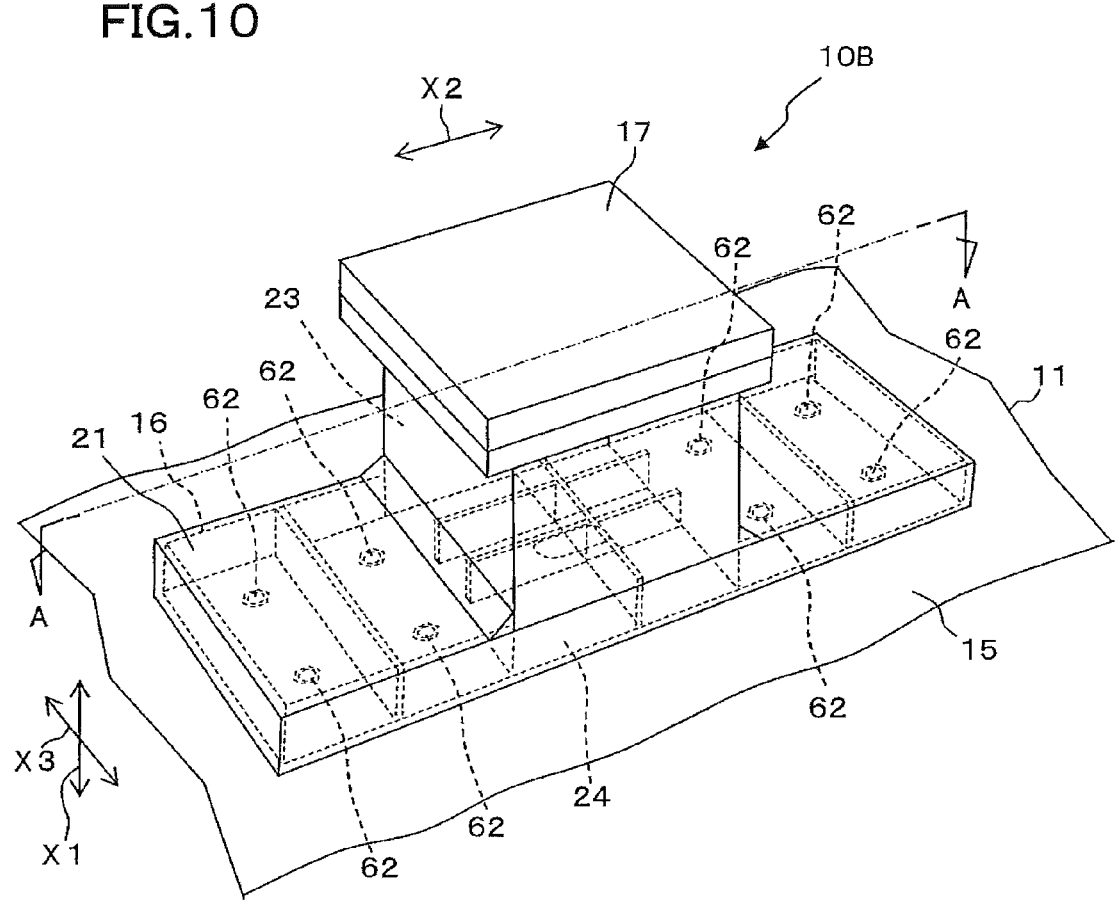
FIG. 10 is a perspective view of a mounting base showing another example.
Figure 11:
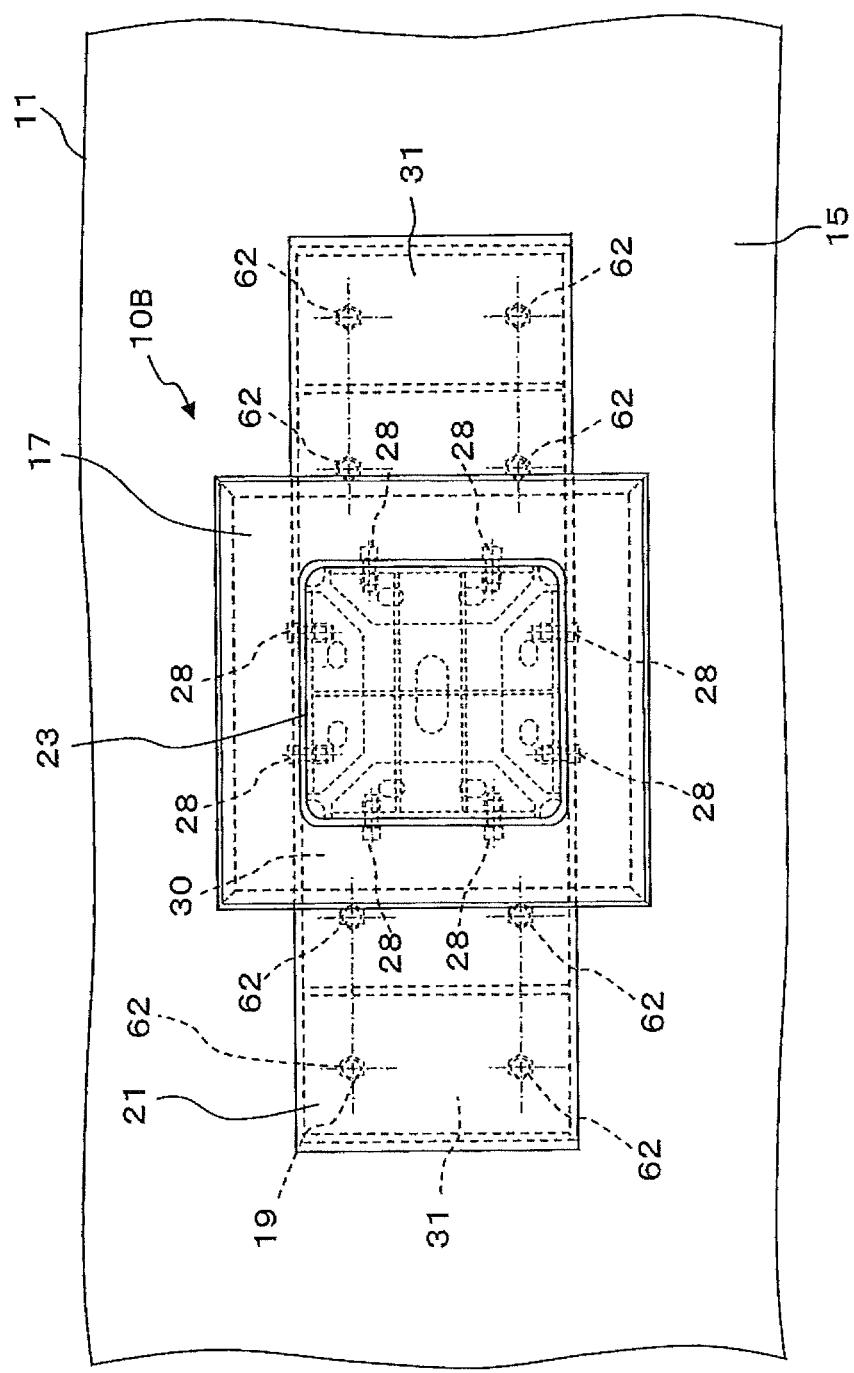
FIG. 11 is a diagram showing a top surface of a mounting base.
Figure 12:
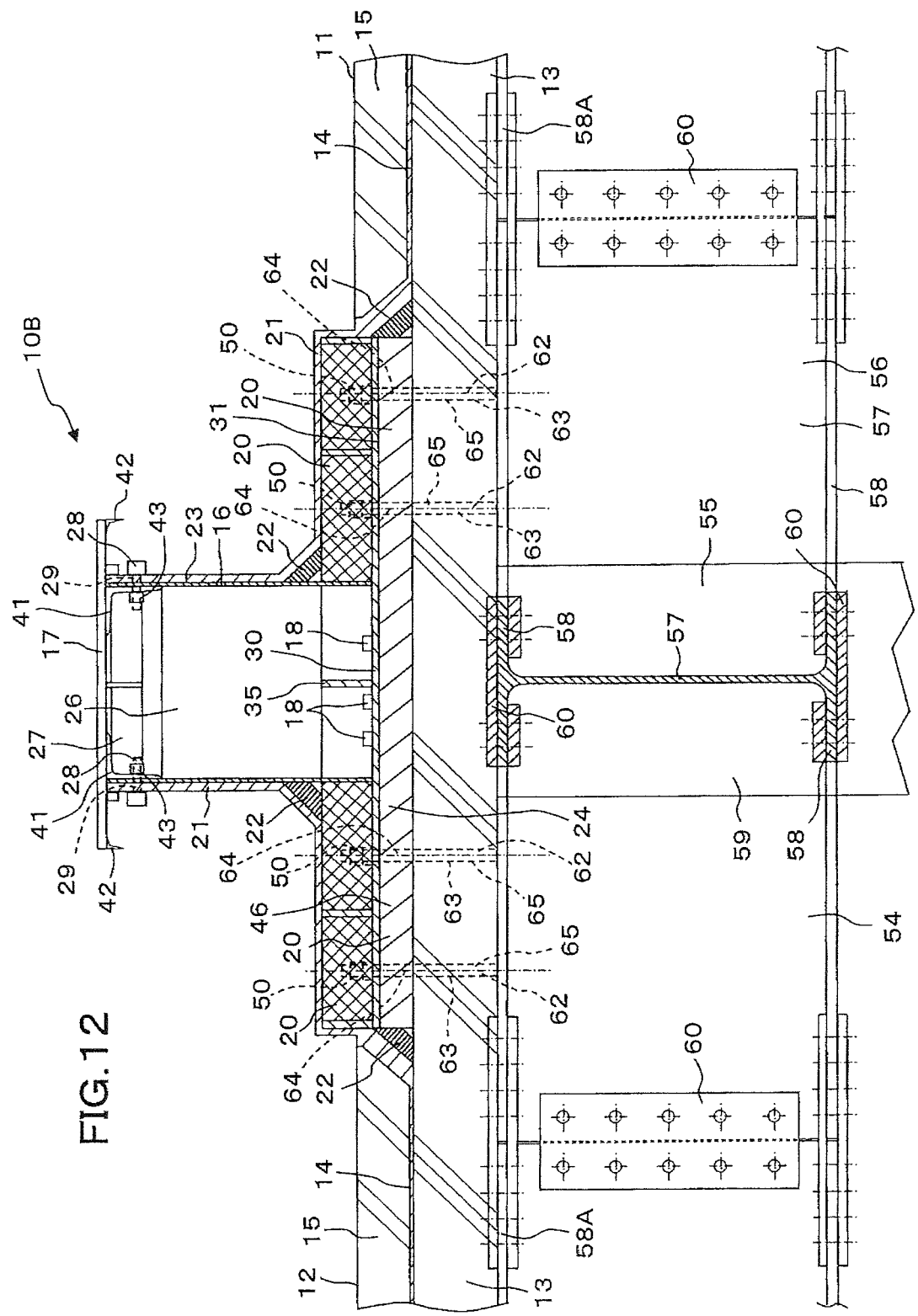
FIG. 12 is a sectional view taken from line B-B of FIG. 10.
Figure 13:
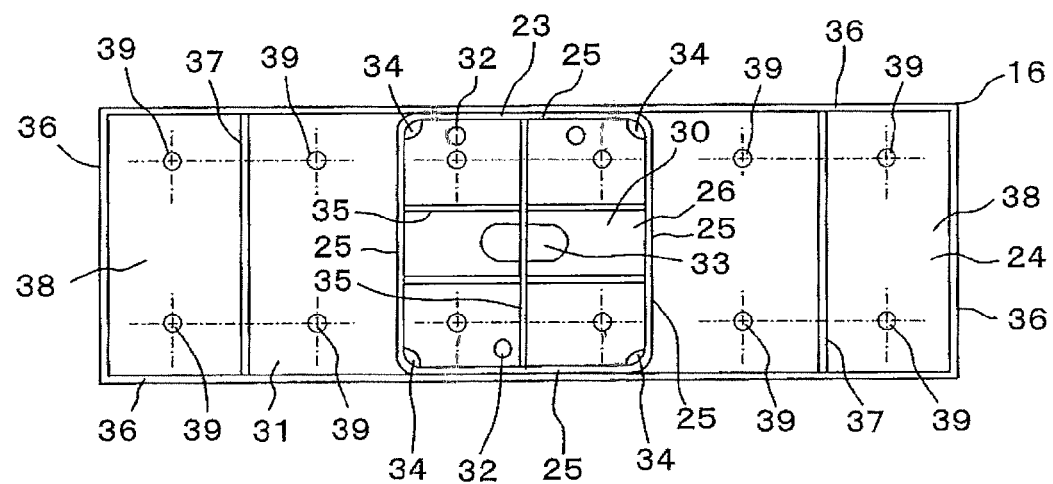
FIG. 13 is a diagram showing a top surface of a metal foundation.
Figure 14:
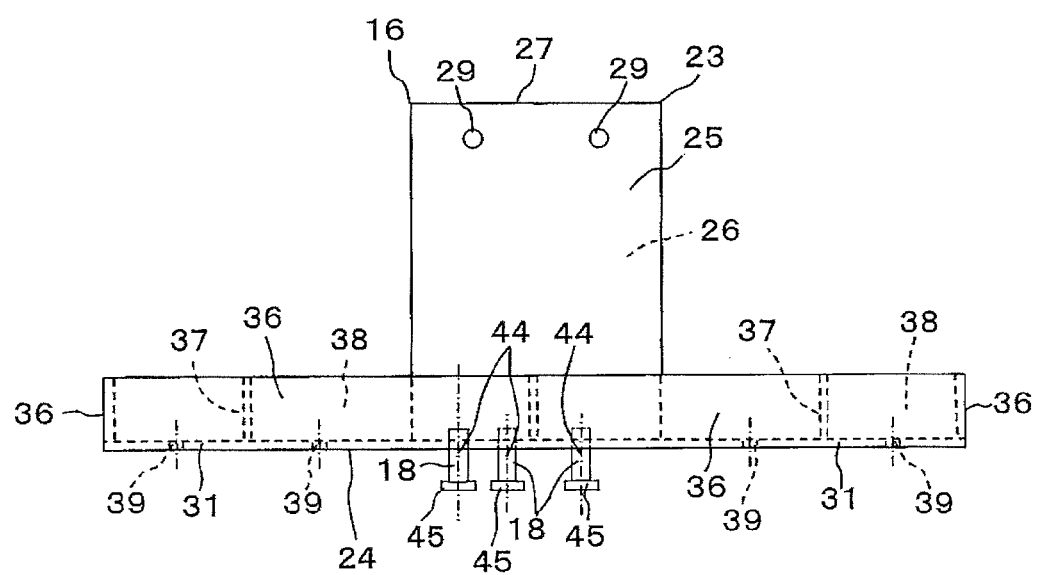
FIG. 14 is a side view of a metal foundation.

FIG. 10 is a perspective view of a mounting base 10B showing another example, and FIG. 11 is a diagram showing a top surface of a mounting base 10B. FIG. 12 is a sectional view taken from line B-B of FIG. 10 and FIG. 13 is a diagram showing a top surface of a metal foundation 16. FIG. 14 is a side view of a metal foundation 16. In FIG. 10, arrow X1 represents a vertical direction, arrow X2 a lateral direction and arrow X3 a longitudinal direction.

The mounting base 10B is different from the one shown in FIG. 1 in that anchor bolts 62 are used instead of support bolts 19, the anchor bolts 62 are fixed to anchor holes 63 provided on the concrete slab 13, and support bolt insertion holes 61 are not provided at an upper flange 58A of an H-shaped steel that forms a steel beam 5. Other configurations, of the base 10B are the same as those of the base 10A shown in FIG. 1. Therefore, as to the components of the base 10B that are numbered the same as those of the base 10A shown in FIG. 1, with reference to FIG. 1 showing the base 10A, the detailed explanations are not repeatedly provided.

The mounting base 10B, like the one shown in FIG. 1, is installed on a concrete slab 13 obtained by removing a covering concrete 15 and a waterproof layer 14 from a concrete floor 12. The mounting base 10B is formed from each of general-purpose (standardized) base components: a metal foundation 16 (foundation), a metal cover 17 (cover), a plurality of height-adjusting bolts 18, a plurality of anchor bolts 62, a mortar 20, a waterproof layer 21 and a molding material 22 (frame material) assembled in a specific manner.

The metal foundation 16 is disposed on the concrete slab 13 obtained by removing the covering concrete 15 and the waterproof layer 14 from the concrete floor 12. The metal foundation 16 is formed from a metal tube 23 and the metal plate 24. The metal tube 23 (including a first portion 30 of the metal plate 24) is disposed just above the concrete slab provided at an intersecting portion of a steel column 55 and a steel beam 56 and a second portion 31 of the metal plate 24 is disposed just above the concrete slab 13 provided on the steel beam 56. The metal tube 23 is the same as the one of the base 10A shown in FIG. 1. The metal foundation 16 is lighter than a reinforced concrete base, because a concrete portion is saved. Thus, the weight of the base 10B can be significantly reduced using the metal foundation 16.

The metal plate 24 has a first portion 30 that internally extends in a radial direction from a lower end edge of the metal tube 23 and a second portion 31 that externally extends in a radial direction from a lower end edge of the metal tube 23. The first portion 30 is provided with a plurality of adjusting bolt screwing holes 32 that screw the height-adjusting bolts 18 (FIG. 13). The first portion 30 is provided with an elliptical fill hole 33 for filling the mortar 20 in the middle and four corners of the first portion 30 are provided with a confirmation hole 34 for confirming the state of the mortar 20 filled (FIG. 13). The first portion 30 is provided with a plurality of reinforcing plates 35 that extend laterally and longitudinally.

The second portion 31 of the metal plate 24 is provided with first side plates 36 that upwardly stand from an end edge along both end edges thereof and first side plates 36 that upwardly stand from a side edge along both side edges thereof. In addition, second side plates 37 positioned between the first side plates 36 that upwardly stand from the second portion 31 are provided. The mortar 20 (cement cured object) is filled into a space 38 surrounded by the second portion 31 of the metal plate 24 and the first side plates 36, and the mortar 20 is cured into the space 38 (FIG. 12). Like the base 10A shown in FIG. 1, a metal top plate is disposed on a top surface of the second portion 31 of the metal plate 24, and the top plate may block an opening of the space 38.

The second portion 31 of the metal plate 24 is provided with a plurality of anchor bolt insertion holes 39 (bolt hole) (bolt hole) that insert anchor bolts 62. The anchor bolt insertion holes 39 are aligned laterally and longitudinally at the second portion 31 with a predetermined interval. The base mounting position of the concrete slab 13 is provided with a plurality of anchor holes 63 that fix the anchor bolts 62. The anchor holes 63 are provided using a drill, which vertically extend from a top surface of the concrete slab 13 toward an undersurface thereof and reach adjacent to an upper flange 58A of an H-shaped steel so that they don't contact with reinforcing bars laid in the concrete slab 13. The anchor holes 63 are positioned at the anchor bolt insertion holes 39 formed at the second portion 31 of the metal plate 24 when the metal foundation 16 is placed on a top surface of the concrete slab 13. The anchor holes 63 are aligned laterally and longitudinally at the concrete slab 13 with a predetermined interval.

The metal cover 17 and the height-adjusting bolts 18 are the same as those of the base 10A shown in FIG. 1. The metal cover 17, like the one shown in FIG. 1, is fixed to a top of the metal tube 24 by cover fixing bolts 28 inserted into fixing bolt insertion holes provided at an angle bar 41 and hexagonal nuts 43 attached to the angle bar 41 to block an opening of the metal tube 24 in a watertight manner.

As the height-adjusting bolt 18, like the one shown in FIG. 1, are rotated in the adjusting bolt screwing holes 32, the metal plate 24 of the metal foundation 16 is upwardly spaced away from a top surface of the concrete slab 13 and a space 46 of a predetermined height dimension is formed between a top surface of the concrete slab 13 and an undersurface of the metal plate 24. By adjusting the screwing position of the height-adjusting bolts 18 relative to the first portion 30 of the metal plate 24 of the metal foundation 16, the height dimension of the space 46 can be adjusted and the height dimension of the metal foundation 16 from a top surface of the concrete slab 13 can be adjusted within the length of the bolt 18.

The anchor bolts 62 are standardized general-purpose products of the same length and diameter. After a plurality of anchor bolts are produced at a base part manufacturing plant other than a construction site. The anchor bolts 62 are made of a steel material, and are inserted into the anchor bolt insertion holes 39 provided at the second portion 31 of the metal plate 24 and inserted into the anchor holes 63 provided on the concrete slab 13. The anchor bolts 62 have first fixed ends 64 that upwardly extend from a top surface of the concrete slab 13, second fixed ends 65 inserted into the anchor holes 63 and fixed to the anchor holes 63. The first and second fixed ends 64, 65 are provided with male screws (not shown).

The second fixed ends 65 of the anchor bolts 62 are fixed at a circumferential edge thereof to the anchor holes 63 with the resin adhesive agent. The first fixed ends 64 of the anchor bolts 62 are inserted into the anchor bolt insertion holes 39 and hexagonal double nuts 50 are screwed into a portion of the first fixed ends 64 that is upwardly exposed from a top surface of the metal plate 24. The first fixed ends 64 of the anchor bolts 62 are fixed to the metal plate 24 with hexagonal double nuts 51 (fixing means). When the hexagonal double nuts 50 are screwed into the first fixed ends 64 of the anchor bolts 62, the height dimension of the metal foundation 16 from a top surface of the concrete slab 13 is already adjusted by the height-adjusting bolts 18.

The mortar 20 is filled into the space 46 from the fill hole 33 formed on the metal plate 24. The mortar 20 filled into the space 46 is cured, and the mortar 20 is jointed on a top surface of the concrete slab 13 and an undersurface of the first and second portions 30, 31 of the metal plate 24 and jointed on the anchor bolts 62. In the space 46, a portion of the first fixed ends 64 of the anchor bolts 62 that extends between a top surface of the concrete slab 13 and a second portion 31 of the metal plate 24 is integrated with the mortar 20. The cured mortar 20 bears the load on the base 10A with a solar panel, an antenna, a water tank, a septic tank, and a mechanical appliance such as an air-conditioning apparatus, a structure such as a steel tower and a steel building thereon (on the metal cover 17) together with the anchor bolts 62.

A trigonal prism-shaped molding material 22 (frame material) is provided at an intersecting portion of the metal tube 23 and the metal plate 24. The molding material 22 is secured to the metal tube 23 and the metal plate 24 with an adhesive agent (not shown) to surround the whole outer circumferential edge of the metal tube 23. The covering concrete 15 and the concrete slab 13 are provided with a trigonal prism-shaped molding material 22 (frame material). The molding material 22 is secured to the concrete slab 13 and the covering concrete 15 with an adhesive agent (not shown). A molding material 22 is provided between an outer circumferential edge of the metal foundation 16 (an outer circumferential edge of the metal plate 24) and the concrete slab 13 (a concrete structure) to surround the whole outer circumferential edge of the metal plate 24 and block a gap between the concrete slab 13 and an outer circumferential edge of the metal plate 24.

The waterproof layer 21 is provided outside each side plate 25 of the metal tube 23 to cover the whole side plate 25 and provided outside of the metal plate 24 (a top surface of the mortar 20 filled into the space 38 or a top surface of a top plate blocking the space 38) to cover the whole metal plate 24 and the whole first and second side plates 36, 37. The waterproof layer 21 involves the use of an asphalt waterproof for preparing asphalt sheet layers by laminating a plurality of thin asphalt sheets. The asphalt sheets are secured to a side plate 25 of the metal tube 23, the mortar 20, the first and second side plates 36, 37 and the molding material 22 with each distinct adhesive property. A portion that externally extends from the second portion 31 of the metal plate 24 of the waterproof layer 21 (an asphalt sheet secured to the molding material 22) is connected to the waterproof layer 14 of the concrete floor 12.

Figure 15:
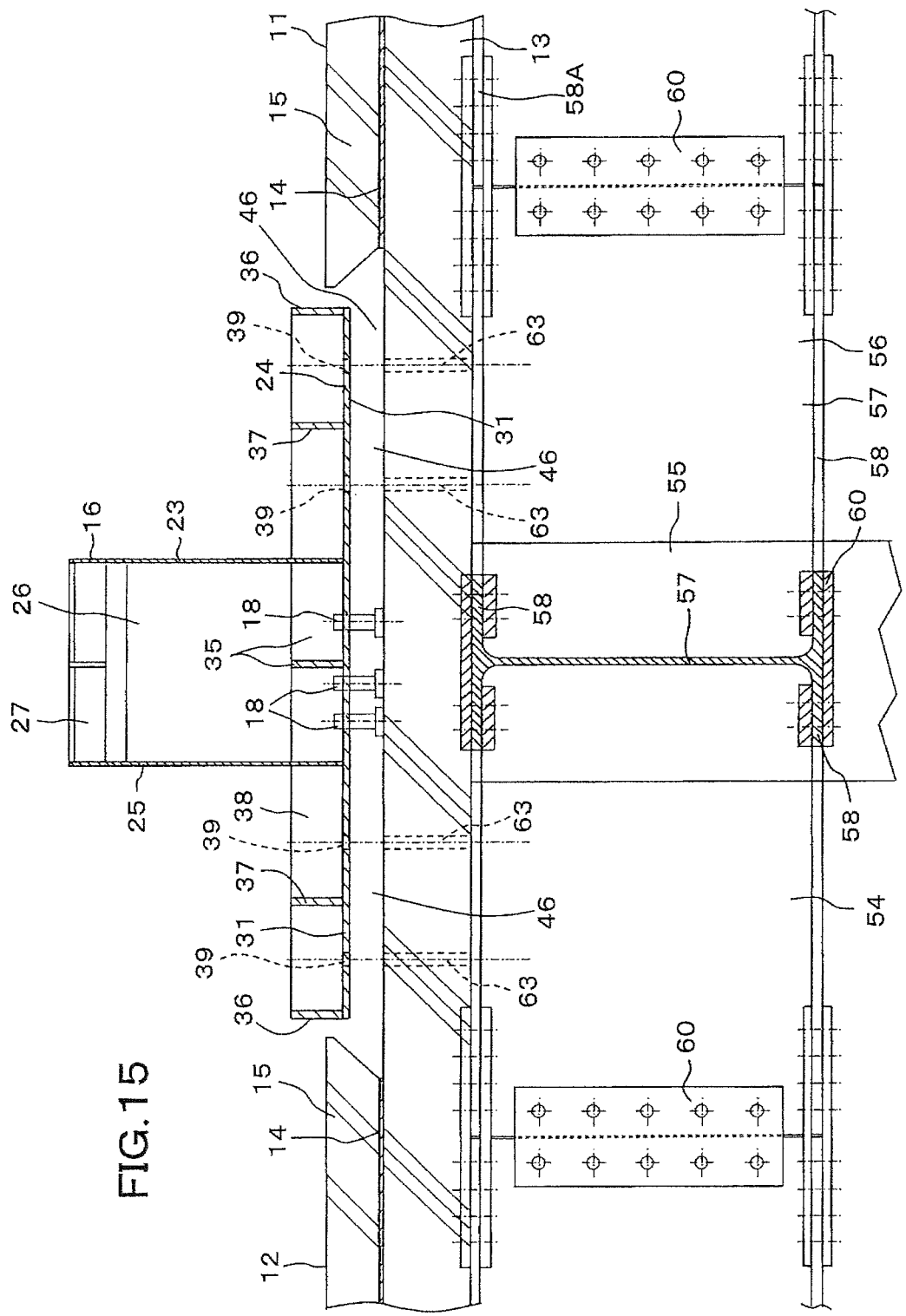
FIG. 15 is a diagram showing one example of a construction process of a mounting base.
Figure 16:
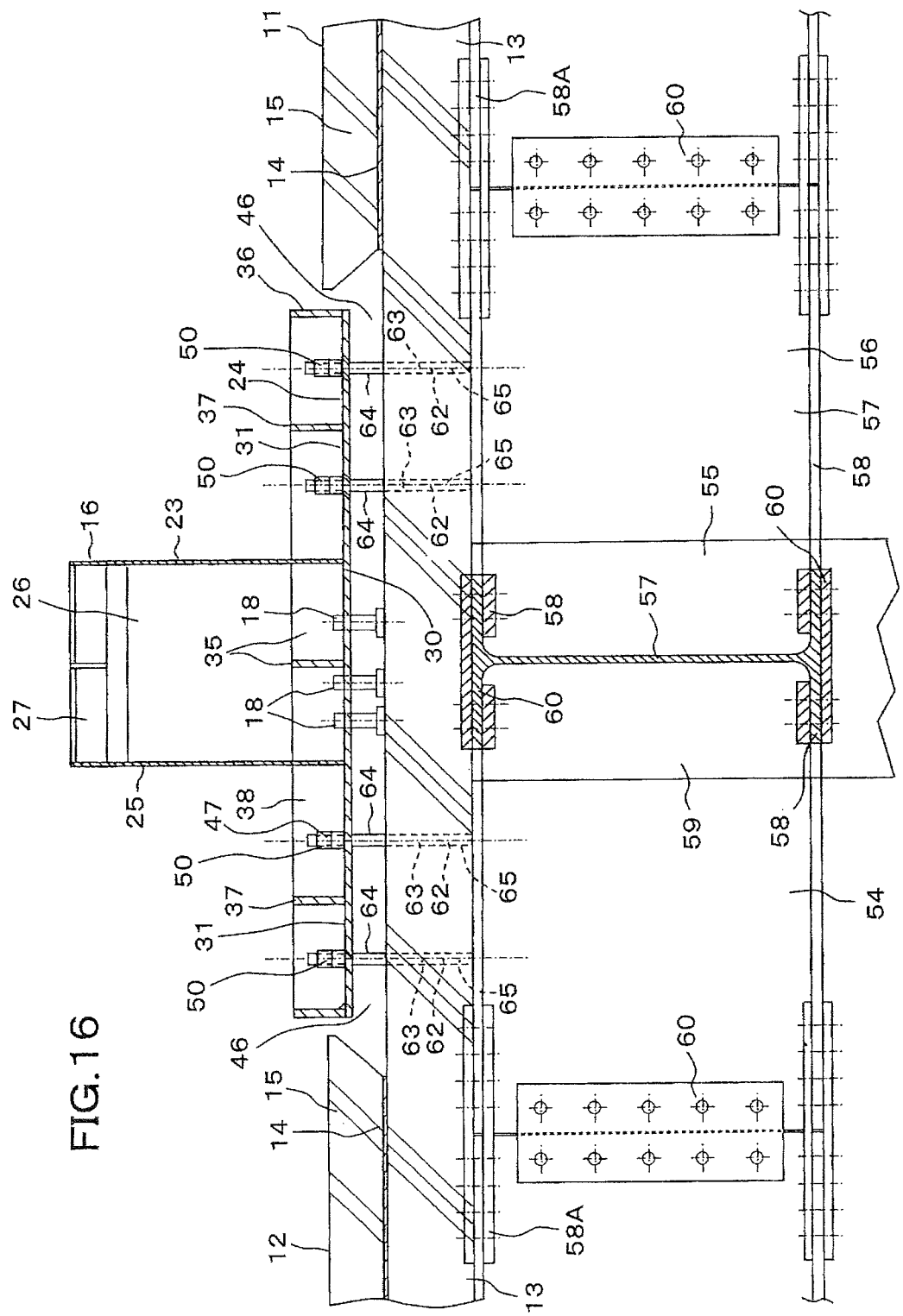
FIG. 16 is a diagram showing a construction process of a mounting base following FIG. 15.
Figure 17:
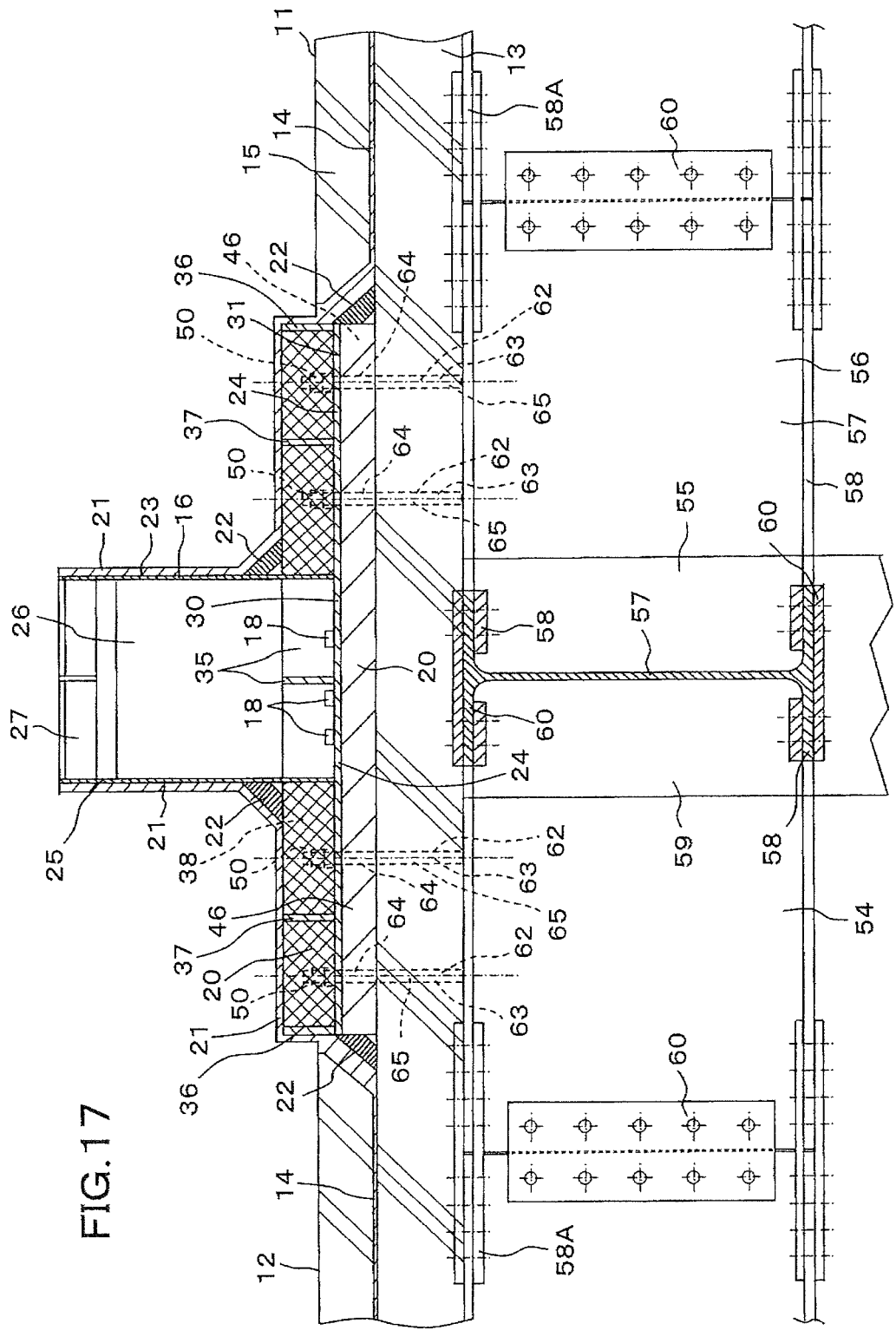
FIG. 17 is a diagram showing a construction process of a mounting base following FIG. 15.

FIG. 15 is a diagram showing one example of a construction process of a mounting base 10B, and FIG. 16 is a diagram showing a construction process of a mounting base 10B following FIG. 15. FIG. 17 is a diagram showing a construction process of a mounting base 10B following FIG. 15. FIGS. 15 to 17 show a steel structure 11 as a section, and each component of the base 10B (not all components) as a section.

With reference to FIGS. 15 to 17 together with FIG. 6-assisted reference, a construction process of the mounting base 10B will be described as an example of mounting a mounting base 10B on a rooftop of the steel structure 11. Upon shipping from a base part manufacturing plant, a second portion 31 of the metal plate 24 is not provided with support bolt insertion holes 39 (bolt hole), and the support bolt insertion holes 39 are bored at the second portion 31 at a construction site. The first portion 30 of the metal plate 24 is provided with a plurality of adjusting bolt screwing holes 32 at a base part manufacturing plant beforehand, and height-adjusting bolts 18 are screwed into the bolt screwing holes 32.

After each of general-purpose base components produced at the base part manufacturing plant (a metal foundation 16 (foundation), a metal cover 17 (cover), the height-adjusting bolts 18, anchor bolts 62, a waterproof layer 21 and a molding material 22 (frame material)) is carried from the plant to a construction site, the mounting position of the base 10B on a rooftop of the steel structure 11 is determined and marked. Subsequently, the concrete slab 13 is exposed by removing the covering concrete 15 and the waterproof layer 14 from the concrete floor 12 at the mounting position (FIG. 6-assisted).

After exposing the concrete slab 13 from the concrete structure 11, the position of reinforcing bars provided inside the concrete slab 13 is measured using a sensor. Subsequently, to install the support bolts 19 off reinforcing bars, the boring position off the reinforcing bars of the support bolt insertion holes 39 (bolt hole) is marked at the second portion 31 of the metal plate 24. With reference to marked positions, the support bolt insertion holes 39 are bored at the boring position of the second portion 31 of the metal plate 24 using a drill (insertion hole boring process). After boring the bolt insertion holes 39, as shown in FIG. 15, the metal foundation 16 is temporarily installed at the mounting position with reference to the marked base mounting position on the concrete slab 13 (foundation temporarily installing process).

In the foundation temporarily installing process, when the metal foundation 16 is temporarily installed, the metal tube 23 and the first portion 30 of the metal plate 24 are positioned just above the concrete slab 13 provided at an intersecting portion of a steel column 55 and a steel beam 56 and the second portion 31 of the metal plate 24 is positioned just above the concrete slab 13 provided on the steel beam 56 to make bolt heads 45 of the height-adjusting bolts 18 abut against a top surface of the concrete slab 13. When the metal foundation 16 is temporarily installed at the mounting position, the foundation 16 stands by itself on a top surface of the concrete slab 13 by being supported by the height-adjusting bolts 18 that abut against a top surface of the concrete slab 13.

After temporarily installing the metal foundation 16, the screwing position of the height-adjusting bolts 18 relative to the first portion 30 of the metal plate 24 of the foundation 16 is adjusted and the installation height of the foundation 16 from a top surface of the concrete slab 13 (height dimension) (height dimension of the space 46) is adjusted (installation height adjusting process). In the mounting base 10B, the height dimension of the metal foundation 16 can be changed during construction of the base 10B using the height-adjusting bolts 18, and a requirement for changing the height dimension of the base 10B can be promptly met. In the mounting base 10B, when a plurality of bases are installed, the height dimension therebetween can be readily adjusted and evenly determined.

After adjusting the height dimension of the metal foundation 16, the boring position of the support bolt insertion holes 40 (bolt hole) of the concrete slab 13 are marked with reference to the positions of support bolt insertion holes 39 of the metal plate 24. Subsequently, after retreating the metal foundation 16 from the temporarily installing position (mounting position), the support bolt insertion holes 40 are bored at the boring position marked using a drill (insertion hole boring process). After providing the support bolt insertion holes 40 on the concrete slab 13, the metal foundation 16 is temporarily installed at the mounting position again, and as shown in FIG. 16, the support bolts 19 are inserted into the support bolt insertion holes 39 provided at the second portion 31 of the metal plate 24, and the support bolts 19 are inserted into the support bolt insertion holes 40 provided on the concrete slab 13.

As the anchor bolts 62 are inserted into the support bolt insertion holes 39 and inserted in anchor holes 63, first fixed ends 64 upwardly extend from a top surface of the concrete slab 13 and second fixed ends 65 are positioned at the anchor holes 63. The second fixed ends 65 of the anchor bolts 62 are fixed at a circumferential edge thereof to the anchor holes 63 with a resin adhesive agent. Subsequently, hexagonal double nuts 50 are screwed into a portion of the first fixed ends 64 of the anchor bolts 62 that upwardly extends from the metal plate 24, and the anchor bolts 62 are fixed to the metal plate 24 and the concrete slab 13 (support bolt fixing process).

After fixing the anchor bolts 62 to the metal plate 24 and the concrete slab 13, and as shown in FIG. 17, a mortar 20 is filled into a space 38 surrounded by the second portion 31 of the metal plate 24 and first side plates 36 to cure the mortar 20. Like the base 10A shown in FIG. 1, a metal top plate is disposed on a top surface of the second portion 31 of the metal plate 24, instead of filling of the mortar 20, and the top plate may block an opening of the space 38.

After the mortar 20 is cured or the opening of the space 38 is blocked by the top plate, a trigonal prism-shaped molding material 22 is provided at an intersecting portion of the metal tube 23 and the metal plate 24 and a trigonal prism-shaped molding material 22 is provided on the covering concrete 15 and the concrete slab 13 (frame material installing process). When the molding material 22 is provided at the intersecting portion of the metal tube 23 and the metal plate 24, the molding material 22 surrounds the whole outer circumferential edge of the metal tube 23. When the molding material 22 is provided on the covering concrete 15 and the concrete slab 13, the molding material 22 surrounds the whole outer circumferential edge of the metal plate 24 and the molding material 22 blocks a gap between the concrete slab 13 and an outer circumferential edge of the metal plate 24.

After installing the molding material 22, a waterproof layer 21 is installed outside each side plate 25 of the metal tube 23 and outside the metal plate 24 (top surface of the mortar 20 filled into the space 38 or top surface of top plate blocking the space 38) (waterproof layer installing process). In the waterproof layer installing process, like the base 10A shown in FIG. 1, a plurality of thin asphalt sheets are secured outside each side plate 25 of the metal tube 23, outside the metal plate 24 and outside the molding material 22 to provide the waterproof layer 21, and a waterproof layer 21 extending from the molding material 22 is connected to the waterproof layer 14 of the steel structure 11. Even if the mounting base 10B is installed outside the steel structure 11, the waterproof layer 21 can prevent water leakage inside the metal foundation 16 and prevent the foundation 16 from corroding and reducing the strength. Also, the waterproof layer 21 can prevent water leakage inside the concrete floor 12 and prevent degradation of the concrete floor 12 and the steel structure 11 therefrom.

After installing the waterproof layer 21, the mortar 20 is filled into the space 46 (cement cured object filling process). In the cement cured object filling process, the state of the mortar 20 filled into the space 46 can be confirmed by a confirmation hole 34 and the mortar 20 is filled into the space 46 from a fill hole 33. In the mounting base 10B, since the mortar 20 can be filled into the space 46 using the fill hole 33 after fixing the support bolts 62 to the metal plate 24 and the concrete slab 13, the mortar 20 can be assuredly filled into the space 46. In the mounting base 10B, the state of the mortar 20 filled into the space 46 is confirmed using the confirmation hole 34 and the mortar 20 can be filled into the space 46 completely evenly.

The metal cover 17 is immediately fitted into a top of the metal tube 23 to block an opening 27 of the metal tube 23 just after filling the mortar 20 into the space 46 and prior to completion of a curing period of the mortar 20. After fitting the metal cover 17 into a top of the metal tube 23, cover fixing bolts 28 are screwed into fixing bolt screwing holes 29 provided at an upper portion of each side plate 25 of metal tube 23, and the bolts 29 are inserted into cover fixing bolt insertion holes of an angle bar 41 of the metal cover 17 and the bolts 29 are screwed into hexagonal nuts 43 attached to the bolt insertion holes to fix the cover 17 to a top of the metal tube 25 (top closing process) (FIG. 12-*assisted*). The opening 27 of the metal tube 25 is blocked by the metal cover 17 in a watertight manner.

In fact, since the gap (a circumferential edge of the space 46) is blocked by the molding material 22, the molding material 22 serves as a bank that prevents the leakage of a pre-cured mortar 20, and the mortar 20 filled into the space 46 shows no leakage from the gap (the space 46), and the opening 27 can be blocked by the metal cover 17 just after filling the mortar 20. In the mounting base 103, the mortar 20 filled into the space 46 just after fitting the metal cover 17 into a top of the metal tube 25 (or fixing) is pre-cured and a curing period of the mortar 20 starts after the cover 17 is fixed to the top of the tube 25.

In the space 46, the mortar 20 filled therein is cured after completion of a curing period of the mortar 20, a portion of the first fixed ends 47 of the support bolts 19 that extends between a top surface of the concrete slab 12 and the metal plate 24 of the metal tube 25 (a portion of the first fixed ends 47 of the support bolts 19 that is downwardly exposed from an undersurface of the metal plate 24) is integrated with the mortar 20 to form a reinforced mortar.

After each of the above processes is completed, the mounting base 10B shown in FIGS. 10 to 12 is completed. In the mounting base 10B, the opening 27 of the metal tube 23 can be immediately blocked by the metal cover 17 to complete the base 10B after filling the mortar 20 into the space 46 and prior to completion of a curing period of the mortar 20, thereby shortening construction time corresponding to the curing period of the mortar 20 filled into the space 46 and constructing a plurality of bases 10B prior to completion of the curing period.

In the mounting base 10B, the base 10B can be constructed only by fixing a plurality of anchor bolts 62 to the second portion 31 of the metal plate 24 of a light metal foundation 16 and the concrete slab 13 (anchor hole 63), filling the mortar 20 into the space 46 and fixing the metal cover 17 to a top of the metal tube 23. All of these general-purpose components are assembled in unit construction system, thereby saving work, cost and time required for producing a framework and curing a mortar, simplifying construction work and significantly shortening construction time required therefor.

In the mounting base 10B, even if the mounting position is on the concrete floor 12 having a waterproof layer provided with a waterproof function on a rooftop and underground part of an existing steel structure 11, the base 10B is installed on the concrete slab 13 exposed after removing the waterproof layer 14 at the mounting position, and the waterproof layer near the mounting position can be repaired (a new waterproof layer 21 can be provided) just after installing the base 10B, thereby promptly installing the base 10B and significantly reducing time required for installing the base 10B.

In the mounting base 10B, the first fixed ends 64 of the anchor bolts 62 are fixed to the second portion 31 of the metal plate 24 and the second fixed ends 65 of the anchor bolts 62 are fixed to the concrete slab 12 (anchor hole 63), thereby firmly installing the base 10B to the steel structure 11 and firmly installing a solar panel, an antenna, a water tank, a septic tank, and a mechanical appliance such as an air-conditioning apparatus, a structure such as a steel tower and a steel building thereon.

In the mounting base 10B, the mortar 20 is filled into the space 46 between a top surface of the concrete slab 13 and an undersurface of the metal plate 24, and the load on the base 10B with a machine and equipment and a structure thereon is borne by the anchor bolts 62 and the mortar 20 so that the base doesn't incline or collapse in an undesired manner by the load of the base 10B to assuredly support the machine and equipment and the structure.

Figure 18:
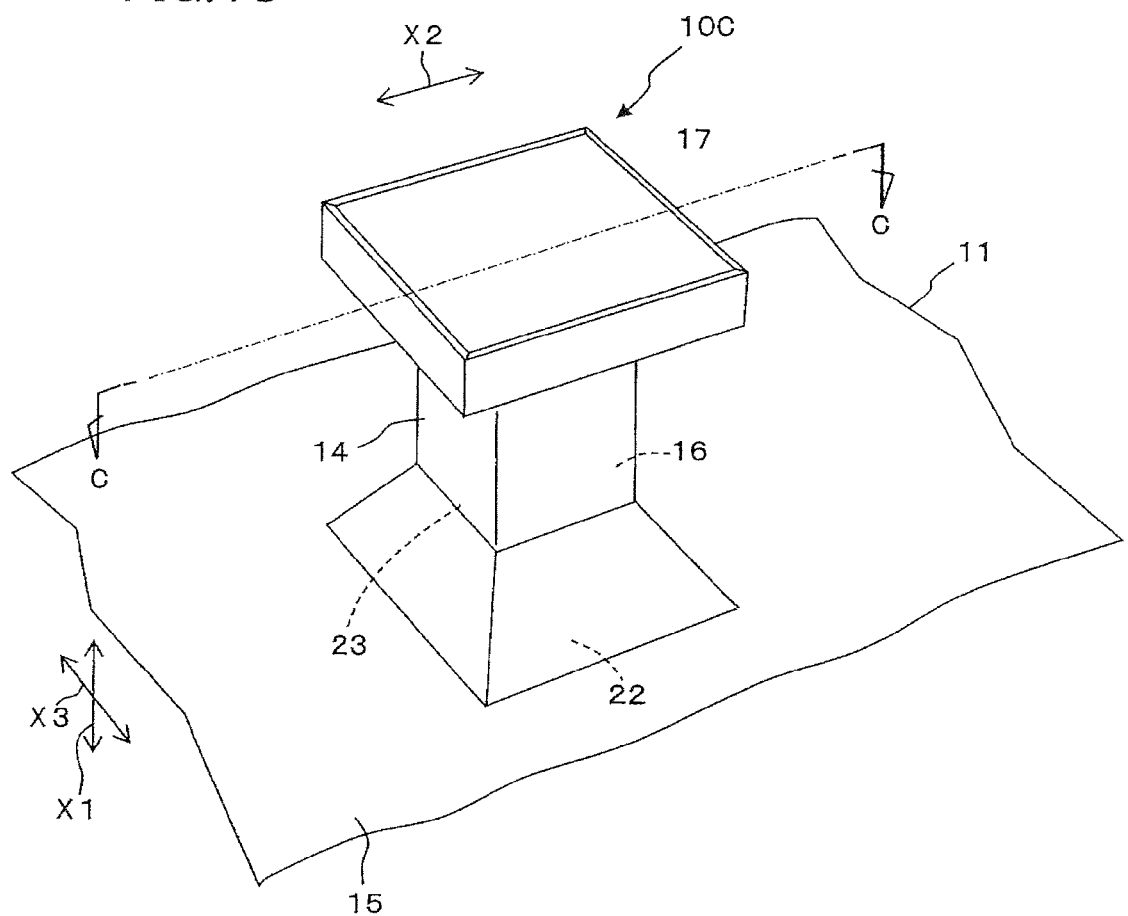
FIG. 18 is a perspective view of amounting base showing another example.
Figure 19:
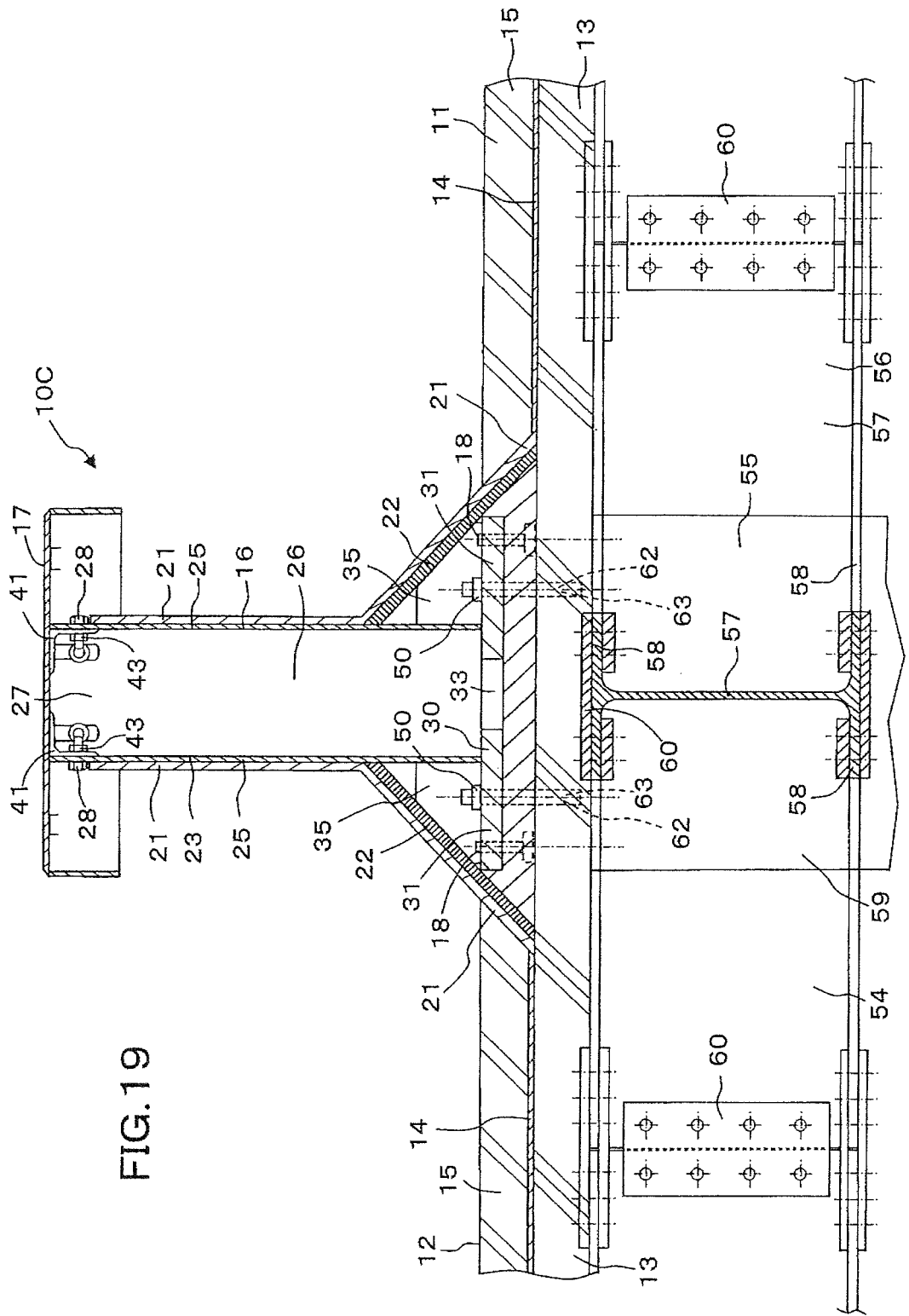
FIG. 19 is a sectional view taken from line A-A of FIG. 1.
Figure 20:
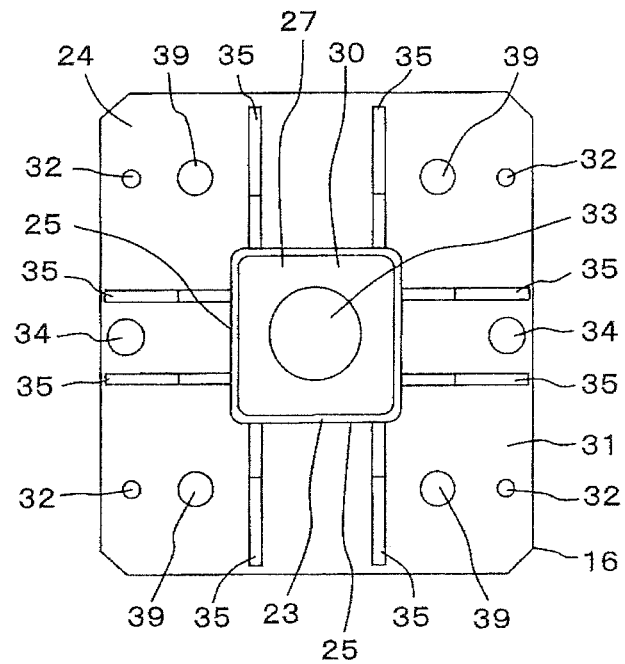
FIG. 20 is a diagram showing a top surface of a metal foundation.
Figure 21:
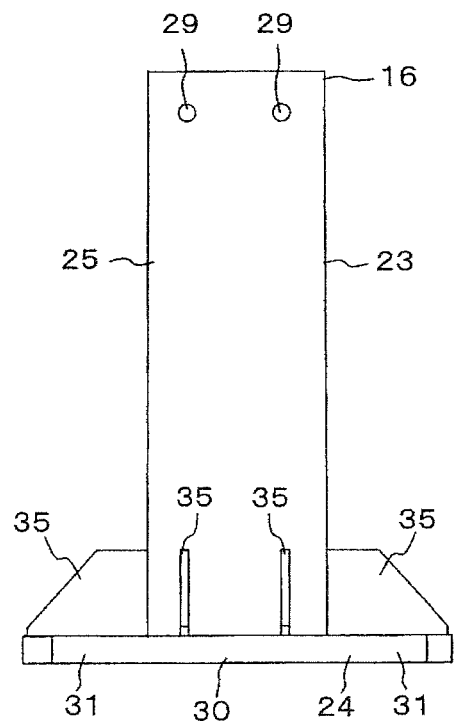
FIG. 21 is a side view of a metal foundation.

FIG. 18 is a perspective view of a mounting base 10C showing another example, FIG. 19 is a sectional view taken from line C-C of FIG. 18, and FIG. 20 is a diagram showing a top surface of a metal foundation 16. FIG. 21 is a side view of a metal foundation 16. In FIG. 18, arrow X1 represents a vertical direction, arrow X2 a lateral direction and arrow X3 a longitudinal direction. The mounting base 10C, like the one shown in FIG. 1, is installed on a concrete slab 13 obtained by removing a covering concrete 15 (mortar layer) and a waterproof layer 14 from a concrete floor 12. The mounting base 10C is formed from each of general-purpose (standardized) base components: a metal foundation 16 (foundation), a metal cover 17 (cover), a plurality of height-adjusting bolts 18, a plurality of anchor bolts 62, a mortar 20, a waterproof layer 21 and a molding material 22 (frame material) assembled in a specific manner.

The metal foundation 16 is a standardized general-purpose product of the same shape and dimension, and after a plurality thereof are produced at a base part manufacturing plant other than a construction site, they are carried to the construction site. The metal foundation 16 is disposed on the concrete slab 13 obtained by removing the covering concrete 15 and the waterproof layer 14 from the concrete floor 12. The metal foundation 16 is formed from a hollow tubular metal tube 23 (tubing material) and a metal plate 24 (bottom plate) having an approximately rectangular planar shape. The metal foundation 16 is produced by welding the metal tube 23 to a top surface of the metal plate 24. The metal tube 23 and the metal plate 24 are made of a metal such as iron, aluminum and alloy. The metal tube 23 and later-described first and second portions 30, 31 of the metal plate 24 are disposed just above the concrete slab 13 provided at an intersecting portion of a steel column 55 and a steel beam 56. The metal foundation 16 is lighter than a reinforced concrete base, because a concrete portion is saved. Thus, the weight of the base 10C can be significantly reduced using the metal foundation 16.

The metal tube 23 has each side plate 25 in an approximately rectangular shape, and a section thereof is formed in an approximately quadrangular shape. The metal tube 23 is disposed on a top surface in the middle of the metal plate 24, and a lower end edge thereof is welded to the top surface of the metal plate 24 to be jointed (fused together). In the metal tube 23, a hollow space 26 is partitioned by the side walls 25, and a top of the metal tube 23 is formed from an opening 27 surrounded by upper end edges of the side plates 25. The top of the metal tube 23 is provided with a plurality of fixing bolt screwing holes 29 that screw cover fixing bolts 28. The fixing bolt screwing holes 29 are provided with female screws (not shown) screwed by the cover fixing bolts 28.

The metal plate 24 has a first portion 30 that internally extends in a radial direction from a lower end edge of the metal tube 23 and a second portion 31 that externally extends in a radial direction from a lower end edge of the metal tube 23. The second portion 31 is provided with a plurality of adjusting bolt screwing holes 32 that screw the height-adjusting bolts 18 (FIG. 20). The adjusting bolt screwing holes 32 are provided with female screws (not shown) screwed by the height-adjusting bolts 18. The number and boring position of the bolt screwing holes 32 at the second portion 31 are not particularly limited, and the bolt screwing holes 32 can be provided at any position of the second portion 31. The first portion 30 of the metal plate 24 is provided with an elliptical fill hole 33 for filling the mortar 20 in the middle. The second portion 31 is provided with a confirmation hole 34 for confirming the state of the mortar 20 filled (FIG. 20).

The second portion 31 of the metal plate 24 has both end edges (circumferential edge) that laterally extend and both side edges (circumferential edge) that longitudinally extend. The metal tube 23 and the second portion 31 of the metal plate 24 are provided with a plurality of reinforcing plate 35 that vertically extend. The reinforcing plates 35 are welded to an outer surface of the metal tube 23 and a top surface of the metal plate 24 to be jointed (fused together). The reinforcing plates 35 serve as a reinforcing material that increases the strength of the metal tube 23 and the metal plate 24.

The second portion 31 of the metal plates 24 is provided with a plurality of anchor bolt insertion holes 39 (bolt hole) that screw the anchor bolts 62. The anchor bolt insertion holes 39 are provided using a drill, which vertically pass through the second portion 31 of the metal plate 24. The anchor bolt insertion holes 39 are aligned laterally and longitudinally at the second portion 31 with a predetermined interval. As shown in FIG. 20, 4 anchor bolt insertion holes 39 are provided, but the number of the insertion holes 39 is not particularly limited, but determined by structural calculation (strength calculation) prior to mounting of the base 10C.

The base mounting position of the concrete skeleton 12 is provided with a plurality of anchor bolt insertion holes 63 (bolt hole) that insert the anchor bolts 62. The anchor holes 63 are provided using a drill, which vertically extend at the concrete slab 13 so that they don't contact with reinforcing bars laid in the concrete slab 13. The anchor holes 63 are positioned at the anchor bolt insertion holes 39 formed at the second portion 31 of the metal plate 24 when the metal foundation 16 is placed on a top surface of the concrete slab 13. The anchor holes 63 are aligned laterally and longitudinally at the concrete slab 13 with a predetermined interval.

The metal cover 17 is a standardized general-purpose product of the same shape and dimension, and is made of a metal such as iron, aluminum and alloy, and a planar shape thereof is formed in an approximately rectangular shape. On an undersurface of the metal cover 17 or inside a circumferential edge of the cover 17 is an angle bar 41 (steel material) for fixing the cover 17 to a top of the metal tube 23 welded to be jointed (fused together). The angle bar 41 is provided with fixing bolt insertion holes (not shown) that insert cover fixing bolts 28, and hexagonal nuts 43 are welded to the fixing bolt insertion holes to be jointed (fused together).

The metal cover 17 is fixed to a top of the metal tube 24 by the cover fixing bolts 28 inserted into fixing bolt insertion holes provided at the angle bar 41 and the hexagonal nuts 43 attached to the angle bar 41 to block the opening 27 of the metal tube 24 in a watertight manner. The top surface of the metal cover 17 is provided with a fixed apparatus for installing a solar panel, an antenna, a water tank, a septic tank, and a mechanical appliance such as an air-conditioning apparatus, a structure such as a steel tower and a steel building (not shown).

The height-adjusting bolts 18 are hexagon head bolts formed from a threaded shaft 44 having a male screw provided and a bolt head 45. The threaded shaft 44 of the height-adjusting bolts 18 is screwed beforehand into the adjusting bolt screwing holes 32 provided at the second portion 31 of the metal plate 24. In the bolt head 45, as the height-adjusting bolts 18 are rotated counterclockwise, the threaded shaft 44 of the bolts 18 slowly advances toward the bolt screwing holes 32 downwardly and downwardly extends from an undersurface of the second portion 31 to make the bolt head 45 abut against a top surface of the concrete beam 13. Accordingly, the metal foundation 16 can be spaced away from a top surface of the concrete skeleton 12 upwardly with a predetermined dimension. Conversely, as the height-adjusting bolts 18 are rotated clockwise, the threaded shaft 44 of the bolts 18 slowly advances toward the bolt screwing holes 32 upwardly and upwardly extends from an undersurface of the second portion 31. Accordingly, the metal foundation 16 can be closer to a top surface of the concrete skeleton 12.

As the height-adjusting bolts 18 are rotated in the adjusting bolt screwing holes 32, the metal plate 24 of the metal foundation 16 is upwardly spaced away from a top surface of the concrete skeleton 12, and a space 46 is formed with a predetermined height dimension between a top surface of the concrete skeleton 12 and an undersurface of the metal plate 24. By adjusting the screwing position of the height-adjusting bolts 18 relative to the second portion 31 of the metal plate 24 of the metal foundation 16, the height dimension of the space 46 can be adjusted and the height dimension of the metal foundation 16 from a top surface of the concrete skeleton 12 can be adjusted within the length of the bolt 18.

The anchor bolts 62 are standardized general-purpose products of the same length and diameter, and made of a steel material, and are inserted into the anchor bolt insertion hole 39 provided at the second portion 31 of the metal plate 24 and inserted into the anchor holes 63 provided on the concrete slab 13. The anchor bolts 62 have first fixed ends 64 that upwardly extend from a top surface of the concrete slab 13 and second fixed ends 65 fixed to the concrete slab 13.

The first fixed ends 64 of the anchor bolts 62 are inserted into the anchor bolt insertion holes 39 opening the metal plate 24 and fixed to the metal plate 24 with hexagonal nuts 50 (fixing means). The hexagonal nuts 50 are attached to a portion of the first fixed ends 64 that upwardly extends from the metal plate 24. The second fixed ends 65 of the anchor bolts 62 are fixed to the insertion holes 40 with a resin adhesive agent (fixing means) (not shown) injected into the anchor holes 63 of the concrete slab 13. When the hexagonal nuts 50 are screwed into the first fixed ends 64 of the anchor bolts 62, the height dimension of the metal foundation 16 from a top surface of the concrete slab 13 is already adjusted by the height-adjusting bolts 18.

The mortar 20 is filled into a space 46 formed between a top surface of the concrete slab 13 and an undersurface of the metal plate 24. The mortar 20 is filled from the fill hole 33 formed on the metal plate 24. The mortar 20 filled into the space 46 is cured and the mortar 20 is jointed to a top surface of the concrete slab 13 and an undersurface of the first and second portions 30, 31 of the metal plate 24 and jointed to the anchor bolts 62.

In the space 46, a portion of the first fixed ends 64 of the anchor bolts 62 that extends between a top surface of the concrete slab 13 and the second portion 31 of the metal plate 24 is integrated with the mortar 20. The cured mortar 20 bears the load on the base 10C (on the metal cover 17) with a solar panel, an antenna, a water tank, a septic tank, and a mechanical appliance such as an air-conditioning apparatus, a structure such as a steel tower and a steel building thereon together with the anchor bolts 62.

The metal tube 23, the metal plate 24, the covering concrete 15 and the concrete slab 13 are provided with the molding material 22 (frame material). The molding material 22 is secured to the metal tube 23, the concrete slab 13 and the covering concrete 15 with an adhesive agent (not shown). The molding material 22 surrounds the whole outer circumferential edge of the metal tube 23 and is provided between an outer circumferential edge of the metal foundation 16 (outer circumferential edge of the metal plate 24) and concrete slab 13 to surround the whole outer circumferential edge of the metal plate 24. The molding material 22 blocks a gap between the concrete slab 13 and an outer circumferential edge of the metal plate 24.

The waterproof layer 21 is provided outside each side plate 25 of the metal tube 23 to cover the whole side plate 25, and provided outside the metal plate 24 to cover the whole metal plate 24. The waterproof layer 21 is employed as an asphalt waterproof that forms asphalt sheet layers by laminating a plurality of thin asphalt sheets. The asphalt sheets are secured to the side plate 25 of the metal tube 23, the mortar 20 and the molding material 22 with each distinct adhesive property. A portion that externally extends from the second portion 31 of the metal plate 24 of the waterproof layer 21 (an asphalt sheet secured to the molding material 22) is connected to the waterproof layer 14 of the concrete structure 11.

Figure 22:
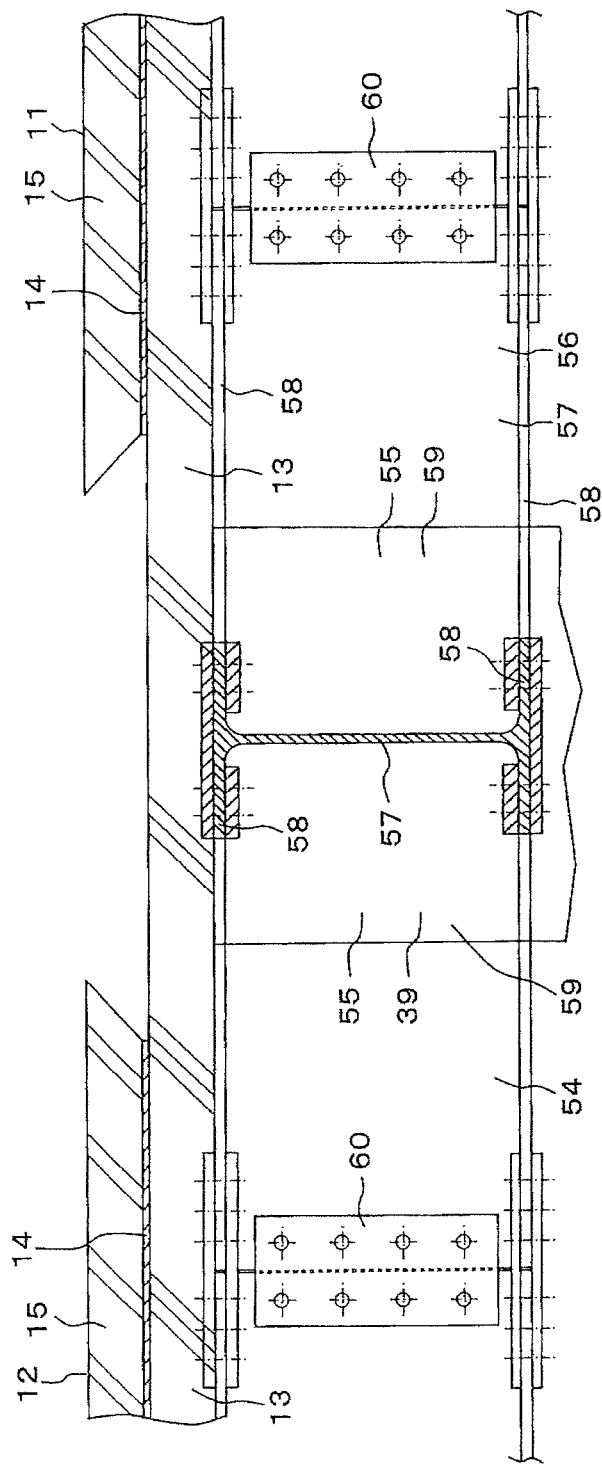
FIG. 22 is a diagram showing one example of a construction process of a mounting base of FIG. 18.
Figure 23:
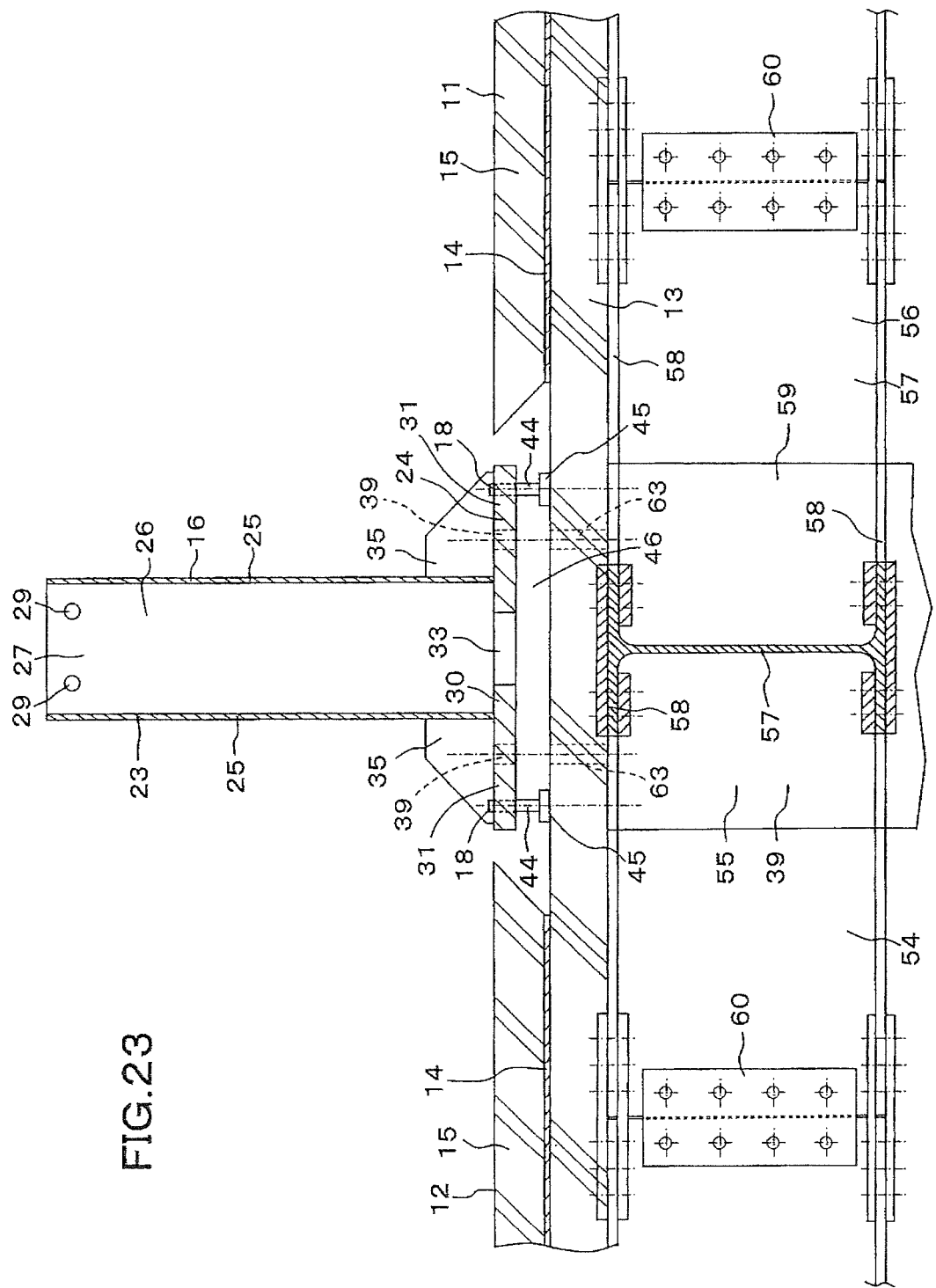
FIG. 23 is a diagram showing a construction process of a mounting base following FIG. 22.
Figure 24:
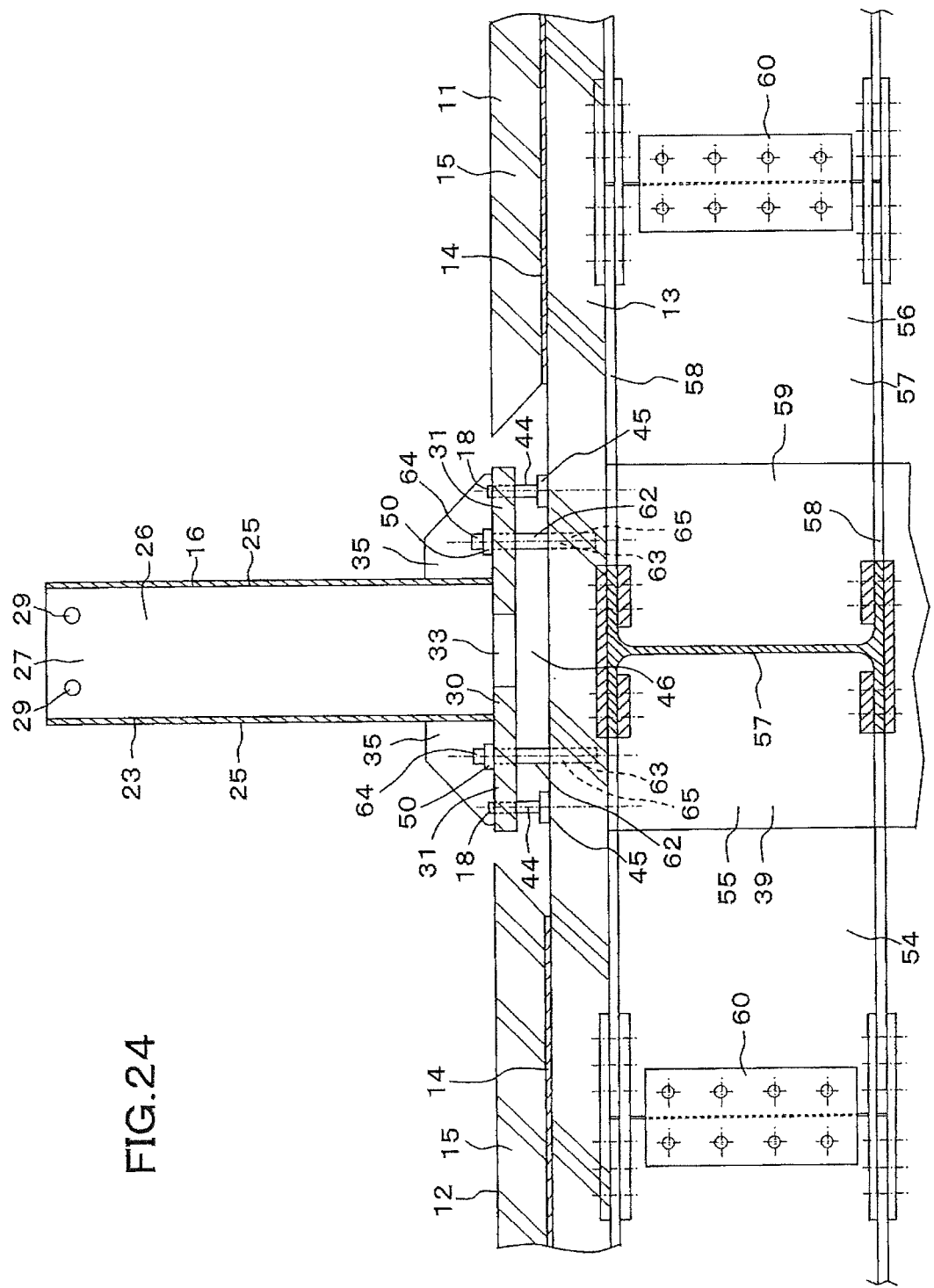
FIG. 24 is a diagram showing a construction process of a mounting base following FIG. 23.
Figure 25:
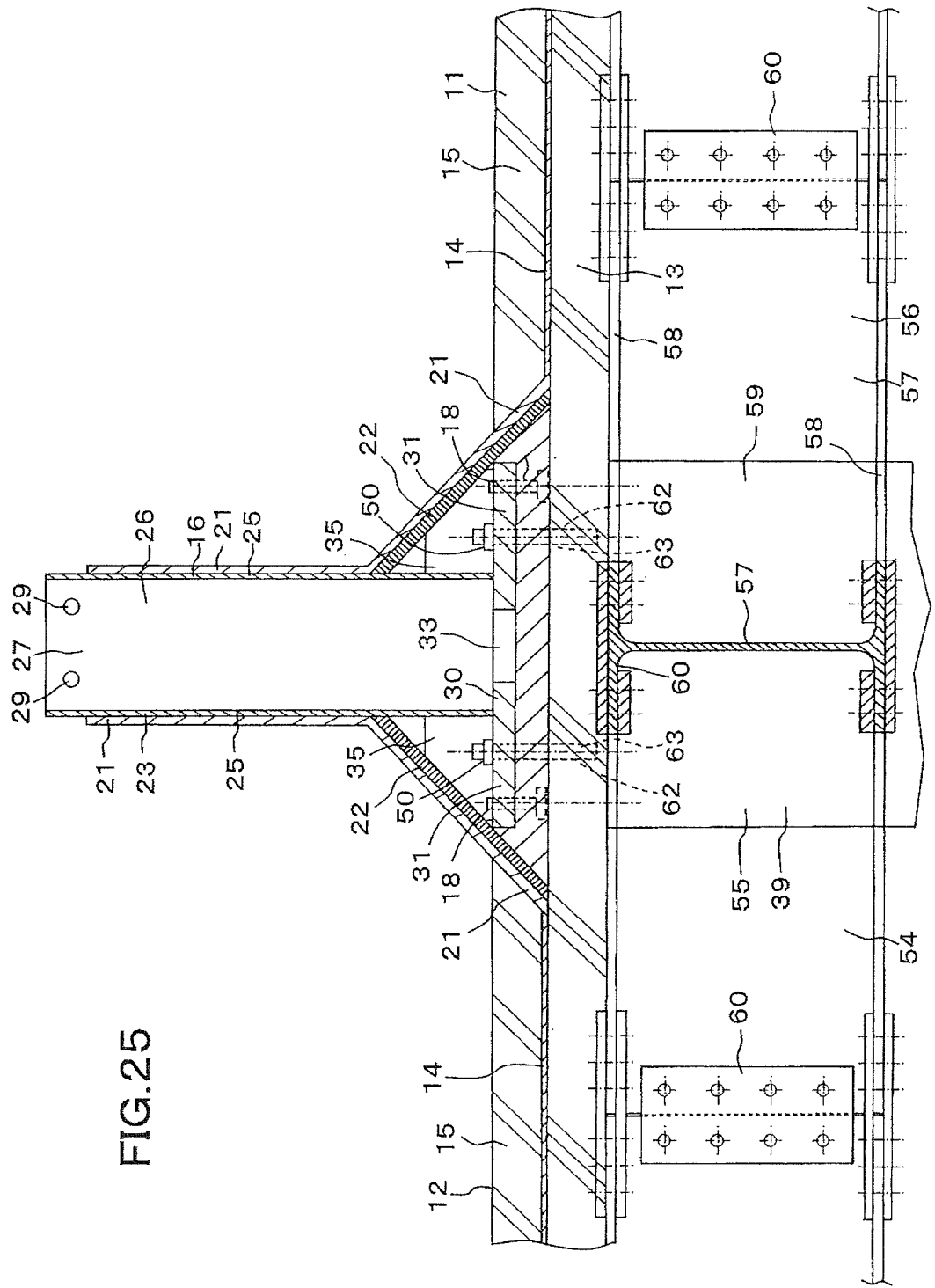
FIG. 25 is a diagram showing a construction process of a mounting base following FIG. 24.

FIG. 22 is a diagram showing one example of a construction process of a mounting base 10C, and FIG. 23 is a diagram showing a construction process of a mounting base 10C following FIG. 22. FIG. 24 is a diagram showing a construction process of a mounting base 10C following FIG. 23 and FIG. 25 is a diagram showing a construction process of a mounting base 10C following FIG. 24. FIGS. 22 to 25 show a steel structure 11 as a section, and each component of the base 10C (not all components) as a section. A construction process of the base 10C will be described as follows with reference to FIGS. 22 to 25 in cases where the mounting base 10C is installed on a rooftop of the steel structure 11.

Upon shipping from a base part manufacturing plant, anchor bolt insertion holes 39 (bolt hole) are not provided at a second portion 31 of a metal plate 24, and anchor bolt insertion holes 39 are bored at the second portion 31 at the construction site. A plurality of adjusting bolt screwing holes 32 are provided beforehand at the second portion 31 of the metal plate 24 at the base part manufacturing plant, and the height-adjusting bolts 18 are screwed into the bolt screwing holes 32.

After each general-purpose base component produced at a base part manufacturing plant (a metal foundation 16 (foundation), a metal cover 17 (cover), height-adjusting bolts 18, anchor bolts 62, a waterproof layer 21 and a molding material 22 (frame material)) is carried from the plant to a construction site, the mounting position of the base 10C on a rooftop of the steel structure 11 is determined and marked. Subsequently, the concrete slab 13 is exposed by removing the covering concrete 15 and the waterproof layer 14 from the steel structure 11 at the mounting position.

After exposing the concrete slab 13 from the steel structure 11, the position of reinforcing bars installed inside the concrete slab 13 is measured using a sensor. Subsequently, since the anchor bolts 62 are installed so that they don't contact with the reinforcing bars, the boring position off the reinforcing bars of the anchor bolt insertion holes 39 (bolt hole) is marked at the second portion 31 of the metal plate 24. With reference to marked positions, the anchor bolt insertion holes 39 are bored at the boring position of the second portion 31 of the metal plate 24 using a drill (insertion hole boring process). After the bolt insertion holes 39 are bored, as shown in FIG. 23, with reference to marked base mounting positions on the concrete slab 13, the metal foundation 16 is temporarily installed at the mounting positions (foundation temporarily installing process).

In the foundation temporarily installing process, when the metal foundation 16 is temporarily installed, the metal tube 23 and the first and second portions 30, 31 of the metal plate 24 are positioned on the concrete skeleton 12 to make a bolt head 45 of the height-adjusting bolts 18 abut against a top surface of the concrete skeleton 12. When the metal foundation 16 is temporarily installed at the mounting position, the foundation 16 stands by itself on a top surface of the concrete skeleton 12 by being supported by the height-adjusting bolts 18 that abut against a top surface of the concrete skeleton 12.

After the metal foundation 16 is temporarily installed, screwing positions of the height-adjusting bolts 18 relative to the second portion 31 of the metal plate 24 of the foundation 16 are adjusted and the installation height of the foundation 16 from a top surface of the concrete slab 13 (height dimension) (height dimension of the space 46) is adjusted (installation height adjusting process). In the mounting base 10C, the height dimension of the metal foundation 16 can be changed during construction of the base 10C using the height-adjusting bolts 18, and a requirement for changing the height dimension of the base 10C can be promptly met. In the mounting base 10C, when a plurality thereof are installed, the height dimension of the bases 10C can be readily adjusted and evenly determined.

After adjusting the height dimension of the metal foundation 16, boring positions of anchor holes 63 (bolt hole) of the concrete slab 13 are marked with reference to positions of the anchor bolt insertion holes 39 of the metal plate 24. Subsequently, after the metal foundation 16 is temporarily retreating from the temporarily installed position (mounting position), the anchor holes 63 are bored at boring positions marked with a drill (insertion hole boring process). After providing the anchor holes 63 on the concrete slab 13, the metal foundation 16 is temporarily installed at the mounting position again, and as shown in FIG. 24, the anchor bolts 62 are inserted into the anchor bolt insertion holes 39 provided at the second portion 31 of the metal plate 24 and the anchor bolts 62 are inserted into the anchor bolt insertion holes 63 provided on the concrete slab 13.

As the anchor bolts 62 are inserted into the anchor bolt insertion holes 39, 40, first fixed ends 64 upwardly extend from a top surface of the concrete slab 13 and second fixed ends 65 are positioned in the anchor holes 63 of the concrete slab 13. A resin adhesive agent (fixing means) (not shown) is injected into the anchor holes 63 and the second fixed ends 65 are fixed to the insertion holes 40 with the resin adhesive agent. Subsequently, hexagonal nuts 50 are screwed into a portion of the first fixed ends 64 of the anchor bolts 62 that upwardly extends from the metal plate 24, and the anchor bolts 62 are fixed to the metal plate 24 and the concrete slab 13 (anchor bolt fixing process).

After the anchor bolts 62 are fixed to the metal plate 24 and the concrete slab 13, and as shown in FIG. 25, the molding material 22 (frame material) is installed on the metal tube 23, the metal plate 24, the covering concrete 15 and the concrete slab 12 (frame material installing process). When the molding material 22 is installed, the molding material 22 surrounds the whole outer circumferential edge of the metal tube 23 and surrounds the whole outer circumferential edge of the metal plate 24 to block a gap between the concrete slab 13 and an outer circumferential edge of the metal plate 24.

After the molding material 22 is installed, the waterproof layer 21 is installed outside each side plate 25 of the metal tube 23 and outside of the metal plate 24 (outside the molding material 22) (waterproof layer installing process). In the waterproof layer installing process, like the base 10A shown in FIG. 1, a plurality of thin asphalt sheets are secured outside each side plate 25 of the metal tube 23 and outside the molding material 22 to provide the waterproof layer 21, and the waterproof layer 21 that extends from the molding material 22 is connected to the waterproof layer 14 of the steel structure 11. Even if the mounting base 100 is installed outside the steel structure 11, the waterproof layer can prevent water leakage inside the metal foundation 16 and prevent the foundation 16 from corroding or decreasing the strength. Also, the waterproof layer 21 can prevent water leakage inside the concrete structure 11 and degradation of the steel structure 11 therefrom.

After the waterproof layer 21 is installed, the mortar 20 is filled into the space 46 (cement cured object filling process). In the cement cured object filling process, the state of the mortar 20 filled into the space 46 is confirmed from a confirmation hole 34 to fill the mortar 20 into the space 46 from a fill hole 33. In the mounting base 10C, since the mortar 20 can be filled into the space 46 using the fill hole 33 after fixing the anchor bolts 62 to the metal plate 24 and the concrete slab 13, the mortar can be assuredly filled into the space 46. In the mounting base 10C, the state of the mortar 20 filled into the space 46 is confirmed using a confirmation hole 34 to fill the mortar 20 into the space 46 completely evenly.

The metal cover 17 is immediately fitted into the top of a metal tube 23 to block an opening 27 of the metal tube 23 just after filling the mortar 20 into the space 46 and prior to completion of a curing period of the mortar 20. After the metal cover 17 is fitted into the top of the metal tube 23, cover fixing bolts 28 are screwed into fixing bolt screwing holes 29 provided at an upper portion of each side plate 25 of the metal tube 23 and bolts 29 are inserted into cover fixing bolt insertion holes of the angle bar 41 of the metal cover 17, and the bolts 29 are screwed into hexagonal nuts 43 provided in bolt insertion holes to fix the cover 17 to a top of the metal tube 25 (top closing process) (FIG. 19). An opening 27 of the metal tube 25 is blocked by the metal cover 17 in a watertight manner.

In fact, since the gap (a circumferential edge of the space 46) is blocked by the molding material 22, the molding material 22 serves as a bank that prevents the leakage of a pre-cured mortar 20, and the mortar 20 filled into the space 46 shows no leakage from the gap (the space 46), and the opening 27 can be blocked by the metal cover 17 just after filling the mortar 20. In the mounting base 100, the mortar 20 filled into the space 46 just after fitting the metal cover 17 into a top of the metal tube 25 (or fixing) is pre-cured and a curing period of the mortar 20 starts after the cover 17 is fixed to the top of the tube 25.

In the space 46, the mortar 20 filled therein is cured after completion of a curing period of the mortar 20, a portion of the first fixed ends 64 of the anchor bolts 62 that extends between a top surface of the concrete slab 13 and the metal plate 24 of the metal tube 25 (a portion of the first fixed ends 64 of the bolts 19 that is downwardly exposed from an undersurface of the metal plate 24) is integrated with the mortar 20 to form a reinforced mortar.

After each of the above processes is completed, the mounting base 10C shown in FIGS. 18 and 19 is completed. In the mounting base 10C, the opening 27 of the metal tube 23 can be immediately blocked by the metal cover 17 to complete the base 10C after filling the mortar 20 into the space 46 and prior to completion of a curing period of the mortar 20, thereby shortening construction time corresponding to the curing period of the mortar 20 filled into the space 46 and constructing a plurality of bases 10C prior to completion of the curing period.

In the mounting base 10C, the base 10C can be constructed only by fixing a plurality of anchor bolts 62 to the second portion 31 of the metal plate 24 of a light metal foundation 16 and the concrete slab 13, filling the mortar 20 into the space 46 and fixing the metal cover 17 to a top of the metal tube 23. All of these general-purpose components are assembled in unit construction system, thereby saving work and time required for producing a formwork and curing a mortar, simplifying construction work and significantly shortening construction time required therefor.

In the mounting base 10C, even if the mounting position is on the concrete floor 12 having a waterproof layer provided with a waterproof function on a rooftop and underground part of an existing steel structure 11, the base 10C is installed on the concrete slab 13 exposed after removing the waterproof layer 14 at the mounting position, and the waterproof layer near the mounting position can be repaired (a new waterproof layer 21 can be provided) just after installing the base 10C, thereby promptly installing the base 10C and significantly reducing time required for installing the base 10C.

In the mounting base 10C, the first fixed ends 64 of the anchor bolts 62 are fixed to the second portion 31 of the metal plate 24 and the second fixed ends 65 of the anchor bolts 62 are fixed to the concrete slab 13, thereby firmly installing the base 10C to the steel structure 11 and firmly installing a solar panel, an antenna, a water tank, a septic tank, and a mechanical appliance such as an air-conditioning apparatus, a structure such as a steel tower and a steel building thereon.

In the mounting base 10C, the mortar 20 is filled into the space 46 between a top surface of the concrete slab 13 and an undersurface of the metal plate 24, and the load on the base 100 with a machine and equipment and a structure thereon is borne by the anchor bolts 62 and the mortar 20 so that the base doesn't incline or collapse in an undesired manner by the load of the base 10C to assuredly support the machine and equipment and the structure.

EXPLANATION OF REFERENCES

10A mounting base
10B mounting base
10C mounting base
11 steel structure
12 concrete floor
13 concrete slab
14 waterproof layer
15 covering concrete
16 metal foundation (foundation)
17 metal cover (cover)
18 height-adjusting bolt
19 support bolt (anchor bolt)
20 mortar (cement cured object)
21 waterproof layer
22 molding material (frame material)
23 metal tube (tubing material)
24 metal plate (bottom plate)
26 hollow space
27 opening
30 first portion
31 second portion
33 fill hole
34 confirmation hole
36 first side plate
37 second side plate
39 support (anchor) bolt insertion hole (bolt hole)
40 support bolt insertion hole (bolt hole)
46 space
47 first fixed end
48 second fixed end
50 hexagonal double nuts (fixing means)
51 hexagonal double nuts (fixing means)
54 steel skeleton
55 steel column
56 steel beam
57 web
58 flange
61 anchor bolt insertion hole (bolt hole)
62 anchor bolt
63 anchor hole (bolt hole)
64 first fixed end
65 second fixed end

The invention claimed is:
1. A mounting base that is installed at a predetermined position of a steel structure having a steel skeleton formed from a steel column and a steel beam, and a concrete floor provided on said steel skeleton, said mounting base comprising a plurality of support bolts that are inserted into bolt hole openings in said steel beam and said concrete floor and have first fixed ends that upwardly extend by passing through said concrete floor and second fixed ends that downwardly extend by passing through said steel beam;

a foundation that is upwardly spaced from said concrete floor at a predetermined interval;

a cover that is installed on said foundation;

a molding material that is provided between an outer circumferential edge of said foundation and said concrete floor that blocks a gap between the concrete floor and the outer circumferential edge of the foundation; and a cement cured object filling a space surrounded by said concrete floor, said foundation and said molding material, wherein said foundation has a bottom plate facing said concrete floor and a hollow tubing material that upwardly extends from said bottom plate, wherein first fixed ends of the support bolts are inserted into the bolt hole openings of said bottom plate and are fixed to the bottom plate with a fastening means, and second fixed ends of the support bolts are fixed to said steel beam with another fastening means, and a portion of the first fixed ends of the support bolts that extends between said concrete floor and said bottom plate is integrated with the cement cured object that fills said space, and said cover blocks an opening at a top of said tubing material, wherein the opening at the top of said tubing material is blocked by said cover just after filling the cement cured object into said space and prior to completion of a curing period of the cement cured object, the curing period of the cement cured object starts after the opening at the top of said tubing material is blocked by said cover, and a portion of the first fixed ends of said support bolts that extends between said concrete floor and said bottom plate is integrated with said cement cured object after completion of said curing period.

2. The mounting base according to claim 1, wherein said bottom plate has a first portion that is positioned within said tubing material and a second portion that is positioned outside of said tubing material, wherein the first fixed ends of said support bolts are inserted into bolt hole openings in the second portion of said bottom plate and are fixed to the second portion of the bottom plate and the second fixed ends of said support bolts are inserted into the bolt hole openings in said steel beam facing said second portion and are fixed to the steel beam, and said molding material is provided between the outer circumferential edge of the second portion of said bottom plate and said concrete floor that blocks a gap between the concrete floor and the outer circumferential edge of the second portion, and a portion of the first fixed ends of said support bolts that extends between said concrete floor and the second portion of said bottom plate is integrated with the cement cured object that fills said space.

3. The mounting base according to claim 2, wherein said concrete floor is formed from a concrete slab provided on said steel column and said steel beam, a waterproof layer provided on said concrete slab and a covering concrete provided on said waterproof layer, wherein said support bolts are inserted into the bolt hole openings in the second portion of said bottom plate and inserted into the bolt hole openings in said concrete slab obtained by removing said covering concrete and said waterproof layer from said concrete floor, said tubing material and the first portion of said bottom plate are disposed on said concrete slab provided at an intersecting portion of said steel column and said steel beam and the second portion of said bottom plate is disposed on said concrete slab provided on said steel beam, and said bottom plate is upwardly spaced from said concrete slab at a predetermined interval.

4. The mounting base according to claim 2, wherein the second portion of said bottom plate has first side plates that extend upwardly from a circumferential edge thereof and second side plates that are positioned between said first side plates that extend upwardly from said second portion, and a space surrounded by the second portion of said bottom plate and said first side plates is partitioned on said foundation with said cement cured object filling said space.

5. The mounting base according to claim 2, wherein the second portion of said bottom plate has first side plates that extend upwardly from a circumferential edge thereof and second side plates that are positioned between said first side plates that extend upwardly from said second portion, and a space surrounded by the second portion of said bottom plate and said first side plates is partitioned on said foundation and a top plate blocks the opening at the top of said space.

6. The mounting base according to claim 2, wherein said mounting base includes a waterproof layer covering said foundation, and a portion of the second portion of said bottom plate of said waterproof layer is connected to the waterproof layer of said concrete floor.

7. The mounting base according to claim 1, wherein a fill hole for filling said cement cured object into the space between said concrete floor and said bottom plate is provided at a predetermined position of said bottom plate.

8. The mounting base according to claim 1, wherein a confirmation hole is provided at a predetermined position of said bottom plate, the confirmation hole allowing a determination of an extent of filing of the space between the concrete floor and the bottom plate with the cement cured object.

9. The mounting base according to claim 1, wherein said mounting base includes height-adjusting bolts screwed into screwing hole openings in said bottom plate, the height-adjusting bolts permitting adjustment of a height dimension of said foundation, and the height dimension of said space and the height dimension of said foundation from said concrete floor can be adjusted by adjusting a screwing position relative to said bottom plate of said height-adjusting bolts.

10. A mounting base that is installed at a predetermined position of an existing steel structure having a steel skeleton formed from a steel column and a steel beam and a concrete floor provided on said steel skeleton, said mounting base comprising a plurality of anchor bolts having first fixed ends that upwardly extend from said concrete floor and second fixed ends that are fixed to anchor hole openings in the concrete floor;

a foundation that is upwardly spaced from said concrete floor at a predetermined interval;

a cover that is installed on said foundation;

a molding material that is provided between an outer circumferential edge of said foundation and said concrete floor that blocks a gap between the concrete floor and the outer circumferential edge of the foundation; and a cement cured object filling a space surrounded by said concrete floor, said foundation and said molding material, wherein said foundation has a bottom plate facing a top surface of said concrete floor and a hollow tubing material that is positioned on a top surface of said bottom plate, wherein first fixed ends of the anchor bolts are inserted into anchor bolt hole openings in said bottom plate and fixed to the bottom plate with a fastening means, and a portion of the first fixed ends of the anchor bolts that extends between said concrete floor and said bottom plate is integrated with the cement cured object that fills said space, and said cover blocks an opening at the top of said tubing material, wherein the opening of said tubing material is blocked by said cover just after filling the cement cured object into said space and prior to completion of a curing period of the cement cured object, the curing period of the cement cured object starts after the opening at the top of said tubing material is blocked by said cover, and a portion of the first fixed ends of said bolts that extends between said concrete floor and said bottom plate is integrated with said cement cured object after completion of said curing period.

11. The mounting base according to claim 10, wherein said bottom plate has a first portion that is positioned within said tubing material and a second portion that is positioned outside of said tubing material, wherein the first fixed ends of said anchor bolts are inserted into anchor bolt hole openings in the second portion of said bottom plate and are fixed to the second portion of the bottom plate and the second fixed ends of said anchor bolts are fixed to the anchor bolt hole openings in said concrete floor facing said second portion, and a portion of the first fixed ends of said anchor bolts that extends between said concrete floor and the second portion of said bottom plate is integrated with the cement cured object that fills said space.

12. The mounting base according to claim 11,
wherein said concrete floor is formed from a concrete slab provided on said steel column and said steel beam, a waterproof layer provided on said concrete slab and a covering concrete provided on said waterproof layer,
wherein said anchor bolts are inserted into the anchor bolt hole openings in the second portion of said bottom plate and fixed to the anchor bolt hole openings in said concrete slab obtained by removing said covering concrete and said waterproof layer from said concrete floor, said tubing material and the first portion of said bottom plate are disposed on said concrete slab provided at an intersecting portion of said steel column and said steel beam, the second portion of said bottom plate is disposed on said concrete slab provided on said steel beam, and said bottom plate is upwardly spaced from said concrete slab at a predetermined interval.

* * * * *